(12) United States Patent
Xu et al.

(10) Patent No.: US 11,882,305 B2
(45) Date of Patent: *Jan. 23, 2024

(54) METHOD AND APPARATUS FOR PALETTE BASED CODING MODE UNDER LOCAL DUAL TREE STRUCTURE

(71) Applicant: TENCENT AMERICA LLC, Palo Alto, CA (US)

(72) Inventors: Xiaozhong Xu, State College, PA (US); Shan Liu, San Jose, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 127 days.

This patent is subject to a terminal disclaimer.

(21) Appl. No.: 17/472,528

(22) Filed: Sep. 10, 2021

(65) Prior Publication Data

US 2021/0409751 A1     Dec. 30, 2021

Related U.S. Application Data

(63) Continuation of application No. 17/097,415, filed on Nov. 13, 2020, now Pat. No. 11,184,632.

(Continued)

(51) Int. Cl.
*H04N 19/50* (2014.01)
*H04N 19/184* (2014.01)
*H04N 19/103* (2014.01)
*H04N 19/186* (2014.01)
*H04N 19/176* (2014.01)

(52) U.S. Cl.
CPC .......... *H04N 19/50* (2014.11); *H04N 19/103* (2014.11); *H04N 19/176* (2014.11); *H04N 19/184* (2014.11); *H04N 19/186* (2014.11)

(58) Field of Classification Search
CPC .... H04N 19/50; H04N 19/184; H04N 19/103; H04N 19/186; H04N 19/176
See application file for complete search history.

(56) References Cited

U.S. PATENT DOCUMENTS

2016/0234494 A1   8/2016   Seregin et al.
2017/0085891 A1   3/2017   Seregin et al.
(Continued)

FOREIGN PATENT DOCUMENTS

EA   201791616 A1   11/2017
RU   2641252 C2     1/2018
(Continued)

OTHER PUBLICATIONS

Russian Office Action dated Mar. 1, 2023 in Application No. 2021129828/07(063269) with English Translation, 18 pages.
(Continued)

*Primary Examiner* — Nam D Pham
(74) *Attorney, Agent, or Firm* — ARENTFOX SCHIFF LLP

(57) ABSTRACT

Aspects of the disclosure provide methods and apparatuses for video encoding/decoding. In some examples, an apparatus for video encoding includes receiving circuitry and processing circuitry. The processing circuitry determines whether a block is under a local dual tree structure, and disallows a palette based coding mode for encoding the block in response to the block being under the local dual tree structure.

20 Claims, 12 Drawing Sheets

Related U.S. Application Data

(60) Provisional application No. 62/963,216, filed on Jan. 20, 2020.

(56) References Cited

U.S. PATENT DOCUMENTS

| | | | |
|---|---|---|---|
| 2017/0195676 | A1 | 7/2017 | Chuang et al. |
| 2020/0260096 | A1* | 8/2020 | Ikai .................. H04N 19/176 |

FOREIGN PATENT DOCUMENTS

| | | |
|---|---|---|
| RU | 2686559 C2 | 4/2019 |
| WO | WO2017/206805 A1 | 12/2017 |
| WO | 2019069950 A1 | 4/2019 |
| WO | WO2019/154417 A1 | 8/2019 |

OTHER PUBLICATIONS

Jing Ye et al, CE15-related: palette mode when dual-tree is enabled, Joint Video Experts Team (JVET) of ITU-T SG 16 WP 3 and ISO/IEC JTC 1/SC 29/WG 11, JVET-L0308, 12th Meeting: Macao, Oct. 3-12, 2018.

Yung-Hsuan Chao et al, CE8-2.1: Palette mode in HEVC, Joint Video Experts Team (JVET) of ITU-T SG 16 WP3 and ISO/IEC JTC 1/SC 29/WG 11, JVET-O0119, 15th Meeting: Gothenburg, Jul. 3-12, 2019.

Weijia Zhu et al., CE8-2.3: Compound Palette Mode, Joint Video Experts Team (JVET) of ITU-T SG16 WP3 and ISO/IEC JTC 1/SC 29/WG11, 15th Meeting, JVET-O0071-v1, Gothenburg, Jul. 3-12, 2019.

Japanese Office Action dated Mar. 24, 2022 in Application No. 2021-558683 in English Translation.

Ru-Ling Liao, et al., CE2-related: Palette mode for non 4:4:4 color format, Joint Video Experts Team (JVET) of ITU-T SG 16 WP 3 and ISO/IEC JTC 1/SC 29/WG 11, JVET-Q0504 (version 1), 17th Meeting: Brussels, BE, Jan. 1, 2020, pp. 1-5.

Hua Yang, and Yuwen He, Non-CE8: Palette mode CU size restriction, Joint Video Experts Team (JVET) of ITU-T SG 16 WP 3 and ISO/IEC JTC 1/SC29/WG 11, JVET-P0375, 16th Meeting: Geneva, CH, Sep. 2019, pp. 1-5.

Zhi-Yi Lin, et al., CE3-2.1.1 and CE3-2.1.2: Removing 2x2, 2x4, and 4x2 chroma CBs, Joint Video Experts Team (JVET) of ITU-T SG 16 WP 3 and ISO/IEC JTC 1/SC 29/WG 11, JVET-O0050-v2, 15th Meeting: Gothenburg, SE, Jun. 2019, pp. 1-5.

Hyeongmun Jang, et al., [AHG16] Clean-up on palette predictor update for local dual tree., Joint Video Experts Team (JVET) of ITU-T SG 16 WP 3 and ISO/IEC JTC 1/SC 29/WG 11, JVET-R0309_v2, 18th Meeting: by teleconference, Apr. 2020, pp. 1-7.

Hong-Jheng Jhu, et al., AHG11: Disabling chroma CU palette mode under local dual tree, Joint Video Experts Team (JVET) of ITU-T SG 16 WP 3 and ISO/IEc JTC 1/SC 29/WG 11, JVET-R0334-v2, 18th Meeting: by teleconference, Apr. 2020, pp. 1-4.

International Search Report and Written Opinion Issued in Application No. PCT/US2021/013264 dated Apr. 2, 2021, citing references AA-AB and AO-AP therein (17 pages).

Rajan Joshi et al., "High Efficiency Video Coding (HEVC) Screen Content Coding: Draft 4", Joint Collaborative Team on Video Coding (JCT-VC) of ITU-T SG 16 WP 3 and ISO/IEC JTC 1/SC 29/WG 11, JCTVC-U1005_r1, 21st Meeting: Warsaw, PL, Jun. 19, 2015-Jun. 26, 2015 (663 pages).

Benjamin Bross et al., "Versatile Video Coding (Draft 7)", Joint Video Experts Team (JVET) of ITU-T SG 16 WP 3 and ISO/IEC JTC 1/SC 29/WG 11, JVET-P2001-vE, 16th Meeting: Geneva, CH, Oct. 1-11, 2019 (492 pages).

Benjamin Bross et al., "Versatile Video Coding (Draft 7)", Joint Video Experts Team (JVET) of ITU-T SG 16 WP 3 and ISO/IEC JTC 1/SC 29/WG 11, JVET-P2001-vE, 16th Meeting: Geneva, CH, Oct. 1-11, 2019 (493 pages).

Mohammed Golam Sarwer et al., "CE2-related: On maximum palette size of VVC", Joint Video Experts Team (JVET) of ITU-T SG 16 WP 3 and ISO/IEC JTC 1/SC 29/WG 11, JVET-Q0291-v1, 17th Meeting Brussels, BE, Jan. 7-17, 2020 (4 pages).

Alibaba Machine Intelligence Technology Lab, "CE2-related: On maximum palette size of VVC", JVET-Q0291 Presentation, Nov. 12, 2020 (7 pages).

Mohammed Golam Sarwer et al., "CE2-related: On maximum palette size of VVC", Joint Video Experts Team (JVET) of ITU-T SG 16 WP 3 and ISO/IEC JTC 1/SC 29/WG 11, JVET-Q0291-v2, 17th Meeting: Brussels, BE, Jan. 7-17, 2020 (4 pages).

Appendix A, JVET-Q0291-YUV444-Dual-tree-ON (16 pages).

* cited by examiner

```
for( i = 0; i < CurrentPaletteSize[ startComp ]; i++ )
    for( compIdx = startComp; compIdx < (startComp + numComps); compIdx++ )
        newPredictorPaletteEntries[ compIdx ][ i ] = CurrentPaletteEntries[ compIdx ][ i ]
newPredictorPaletteSize = CurrentPaletteSize[ startComp ]
for( i = 0; i < PredictorPaletteSize[ startComp ] && newPredictorPaletteSize < 63; i++ )
    if( !PalettePredictorEntryReuseFlags[ i ] ) {
        for( compIdx = startComp; compIdx < (startComp + numComps); compIdx++ )
            newPredictorPaletteEntries[ compIdx ][ newPredictorPaletteSize ] =
                PredictorPaletteEntries[ compIdx ][ i ]
        newPredictorPaletteSize++
    }
for( compIdx = startComp; compIdx < ( startComp + numComps ); compIdx++ )
    for( i = 0; i < newPredictorPaletteSize; i++ )
        PredictorPaletteEntries[ compIdx ][ i ] = newPredictorPaletteEntries[ compIdx ][ i ]
PredictorPaletteSize[ startComp ] = newPredictorPaletteSize
```

*FIG. 9*

```
if( CuPredMode[ chType ][ x0 ][ y0 ] == MODE_INTRA && sps_palette_enabled_flag && cbWidth <=
64 && cbHeight <= 64 && cu_skip_flag[ x0 ][ y0 ] == 0 && modeType != MODE_TYPE_INTER &&
 ( ( ( cbWidth × cbHeight ) > ( treeType != DUAL_TREE_CHROMA ? 16 : 16 × SubWidthC × SubHeightC ) ) &&
 ( modeType != MODE_TYPE_INTRA || treeType != DUAL_TREE_CHROMA ) )
    pred_mode_plt_flag
...
```

FIG. 10

METHOD AND APPARATUS FOR PALETTE BASED CODING MODE UNDER LOCAL DUAL TREE STRUCTURE

INCORPORATION BY REFERENCE

This present application is a continuation of U.S. patent application Ser. No. 17/097,415, "METHOD AND APPARATUS FOR PALETTE BASED CODING MODE UNDER LOCAL DUAL TREE STRUCTURE" filed on Nov. 13, 2020, which claims the benefit of priority to U.S. Provisional Application No. 62/963,216, "SIMPLIFIED PALETTE MODE CODING WITH LOCAL DUAL TREE CODING STRUCTURE" filed on Jan. 20, 2020. The entire disclosures of the prior applications are hereby incorporated by reference in their entirety.

TECHNICAL FIELD

The present disclosure describes embodiments generally related to video coding.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Video coding and decoding can be performed using inter-picture prediction with motion compensation. Uncompressed digital video can include a series of pictures, each picture having a spatial dimension of, for example, 1920×1080 luminance samples and associated chrominance samples. The series of pictures can have a fixed or variable picture rate (informally also known as frame rate), of, for example 60 pictures per second or 60 Hz. Uncompressed video has specific bitrate requirements. For example, 1080p60 4:2:0 video at 8 bit per sample (1920×1080 luminance sample resolution at 60 Hz frame rate) requires close to 1.5 Gbit/s bandwidth. An hour of such video requires more than 600 GBytes of storage space.

One purpose of video coding and decoding can be the reduction of redundancy in the input video signal, through compression. Compression can help reduce the aforementioned bandwidth and/or storage space requirements, in some cases by two orders of magnitude or more. Both lossless compression and lossy compression, as well as a combination thereof can be employed. Lossless compression refers to techniques where an exact copy of the original signal can be reconstructed from the compressed original signal. When using lossy compression, the reconstructed signal may not be identical to the original signal, but the distortion between original and reconstructed signals is small enough to make the reconstructed signal useful for the intended application. In the case of video, lossy compression is widely employed. The amount of distortion tolerated depends on the application; for example, users of certain consumer streaming applications may tolerate higher distortion than users of television distribution applications. The compression ratio achievable can reflect that: higher allowable/tolerable distortion can yield higher compression ratios.

A video encoder and decoder can utilize techniques from several broad categories, including, for example, motion compensation, transform, quantization, and entropy coding.

Video codec technologies can include techniques known as intra coding. In intra coding, sample values are represented without reference to samples or other data from previously reconstructed reference pictures. In some video codecs, the picture is spatially subdivided into blocks of samples. When all blocks of samples are coded in intra mode, that picture can be an intra picture. Intra pictures and their derivations such as independent decoder refresh pictures, can be used to reset the decoder state and can, therefore, be used as the first picture in a coded video bitstream and a video session, or as a still image. The samples of an intra block can be exposed to a transform, and the transform coefficients can be quantized before entropy coding. Intra prediction can be a technique that minimizes sample values in the pre-transform domain. In some cases, the smaller the DC value after a transform is, and the smaller the AC coefficients are, the fewer the bits that are required at a given quantization step size to represent the block after entropy coding.

Traditional intra coding such as known from, for example MPEG-2 generation coding technologies, does not use intra prediction. However, some newer video compression technologies include techniques that attempt, from, for example, surrounding sample data and/or metadata obtained during the encoding/decoding of spatially neighboring, and preceding in decoding order, blocks of data. Such techniques are henceforth called "intra prediction" techniques. Note that in at least some cases, intra prediction is using reference data only from the current picture under reconstruction and not from reference pictures.

There can be many different forms of intra prediction. When more than one of such techniques can be used in a given video coding technology, the technique in use can be coded in an intra prediction mode. In certain cases, modes can have submodes and/or parameters, and those can be coded individually or included in the mode codeword. Which codeword to use for a given mode/submode/parameter combination can have an impact in the coding efficiency gain through intra prediction, and so can the entropy coding technology used to translate the codewords into a bitstream.

A certain mode of intra prediction was introduced with H.264, refined in H.265, and further refined in newer coding technologies such as joint exploration model (JEM), versatile video coding (VVC), and benchmark set (BMS). A predictor block can be formed using neighboring sample values belonging to already available samples. Sample values of neighboring samples are copied into the predictor block according to a direction. A reference to the direction in use can be coded in the bitstream or may itself be predicted.

Referring to FIG. 1, depicted in the lower right is a subset of nine predictor directions known from H.265's 33 possible predictor directions (corresponding to the 33 angular modes of the 35 intra modes). The point where the arrows converge (101) represents the sample being predicted. The arrows represent the direction from which the sample is being predicted. For example, arrow (102) indicates that sample (101) is predicted from a sample or samples to the upper right, at a 45 degree angle from the horizontal. Similarly, arrow (103) indicates that sample (101) is predicted from a sample or samples to the lower left of sample (101), in a 22.5 degree angle from the horizontal.

Still referring to FIG. 1, on the top left there is depicted a square block (104) of 4×4 samples (indicated by a dashed, boldface line). The square block (104) includes 16 samples, each labelled with an "S", its position in the Y dimension (e.g., row index) and its position in the X dimension (e.g., column index). For example, sample S21 is the second sample in the Y dimension (from the top) and the first (from the left) sample in the X dimension. Similarly, sample S44 is the fourth sample in block (104) in both the Y and X dimensions. As the block is 4×4 samples in size, S44 is at the bottom right. Further shown are reference samples that follow a similar numbering scheme. A reference sample is labelled with an R, its Y position (e.g., row index) and X position (column index) relative to block (104). In both H.264 and H.265, prediction samples neighbor the block under reconstruction; therefore no negative values need to be used.

Intra picture prediction can work by copying reference sample values from the neighboring samples as appropriated by the signaled prediction direction. For example, assume the coded video bitstream includes signaling that, for this block, indicates a prediction direction consistent with arrow (102)—that is, samples are predicted from a prediction sample or samples to the upper right, at a 45 degree angle from the horizontal. In that case, samples S41, S32, S23, and S14 are predicted from the same reference sample R05. Sample S44 is then predicted from reference sample R08.

In certain cases, the values of multiple reference samples may be combined, for example through interpolation, in order to calculate a reference sample; especially when the directions are not evenly divisible by 45 degrees.

The number of possible directions has increased as video coding technology has developed. In H.264 (year 2003), nine different direction could be represented. That increased to 33 in H.265 (year 2013), and JEMNVC/BMS, at the time of disclosure, can support up to 65 directions. Experiments have been conducted to identify the most likely directions, and certain techniques in the entropy coding are used to represent those likely directions in a small number of bits, accepting a certain penalty for less likely directions. Further, the directions themselves can sometimes be predicted from neighboring directions used in neighboring, already decoded, blocks.

FIG. 2 shows a schematic (201) that depicts 65 intra prediction directions according to JEM to illustrate the increasing number of prediction directions over time.

The mapping of intra prediction directions bits in the coded video bitstream that represent the direction can be different from video coding technology to video coding technology; and can range, for example, from simple direct mappings of prediction direction to intra prediction mode, to codewords, to complex adaptive schemes involving most probable modes, and similar techniques. In all cases, however, there can be certain directions that are statistically less likely to occur in video content than certain other directions. As the goal of video compression is the reduction of redundancy, those less likely directions will, in a well working video coding technology, be represented by a larger number of bits than more likely directions.

SUMMARY

Aspects of the disclosure provide methods and apparatuses for video encoding/decoding. In some examples, an apparatus for video encoding includes receiving circuitry and processing circuitry. The processing circuitry determines whether a block is under a local dual tree structure, and disallows a palette based coding mode for encoding the block in response to the block being under the local dual tree structure.

In some embodiments, the processing circuitry disallows the palette based coding mode for encoding the block in response to the block being of a specific color component and under the local dual tree structure. In an example, the processing circuitry disallows the palette based coding mode for encoding the block in response to the block being of a chroma component and under the local dual tree structure. In another example, the processing circuitry disallows the palette based coding mode for encoding the block in response to the block being of a luma component and under the local dual tree structure.

In some embodiments, the processing circuitry determines whether to allow the palette based coding mode for encoding the block based on a comparison of a size of the block with a threshold. In an example, the processing circuitry encodes the block based on the determination of whether to allow the palette based coding mode for encoding the block and the determination of whether the block being under the local dual tree structure. In another example, the processing circuitry disallows the palette based coding mode for the block in response to the size of the block being smaller than the threshold. In some examples, the threshold is defined to disallow the local dual tree structure in response to the block being larger than the threshold.

In some embodiments, the processing circuitry disallows the palette based coding mode for encoding the block based on a combination of a mode type and a tree type of the block that indicates the block being a chroma block under the local dual tree structure.

In some embodiments, the processing circuitry encodes a flag in a video bitstream that carries an encoded block corresponding to the block to indicate whether the palette based coding mode is used on the block in response to the palette based coding mode being allowed.

Aspects of the disclosure also provide a non-transitory computer-readable medium storing instructions which when executed by a computer cause the computer to perform the method for video encoding.

BRIEF DESCRIPTION OF THE DRAWINGS

Further features, the nature, and various advantages of the disclosed subject matter will be more apparent from the following detailed description and the accompanying drawings in which:

FIG. 9 shows a syntax example for updating a palette prediction list in some examples.

FIG. 10 shows a syntax example for determining, in the bitstream, an existence of a palette mode flag in some examples.

DETAILED DESCRIPTION OF EMBODIMENTS

Figure 1:
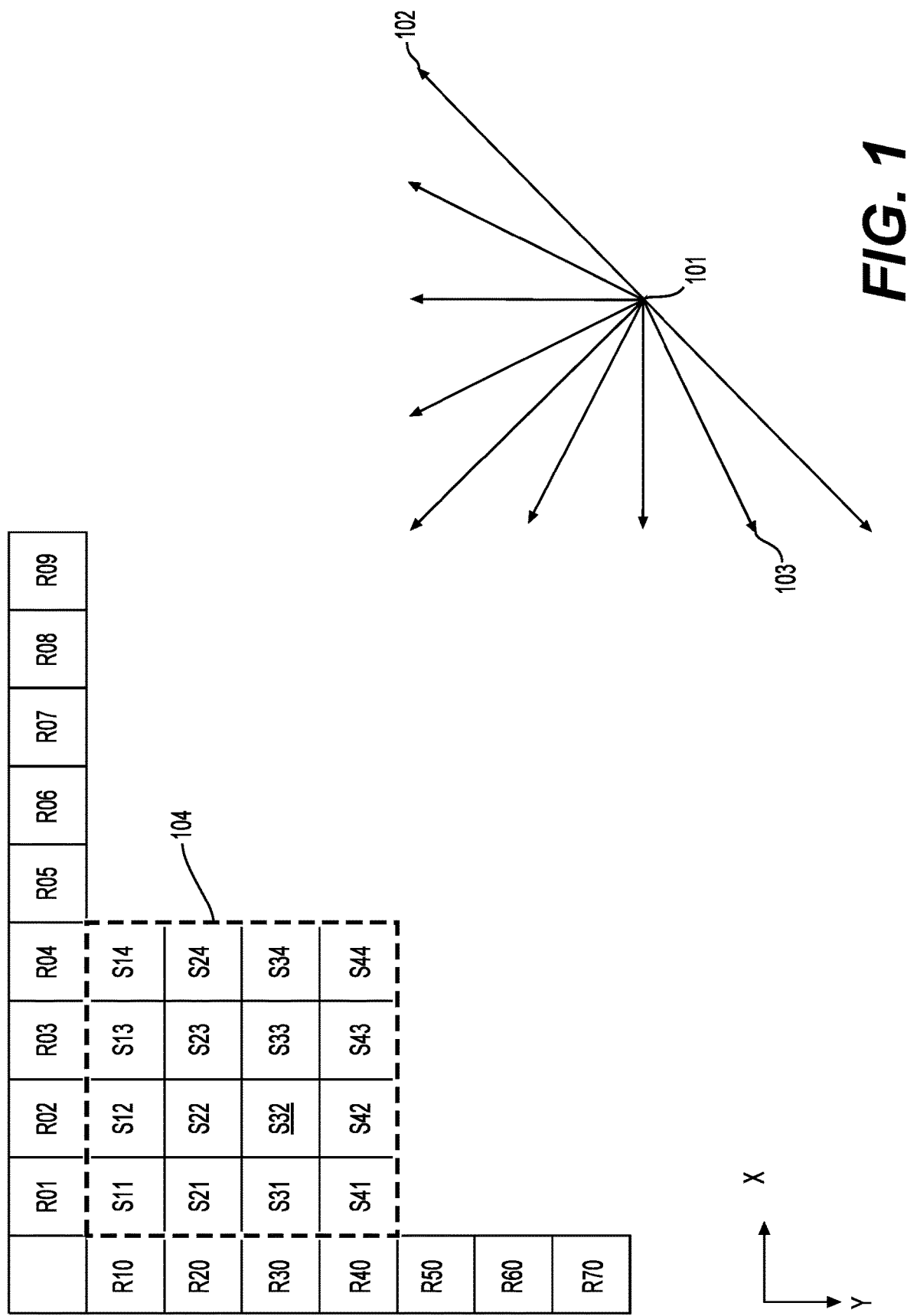
FIG. 1 is a schematic illustration of an exemplary subset of intra prediction modes.
Figure 2:
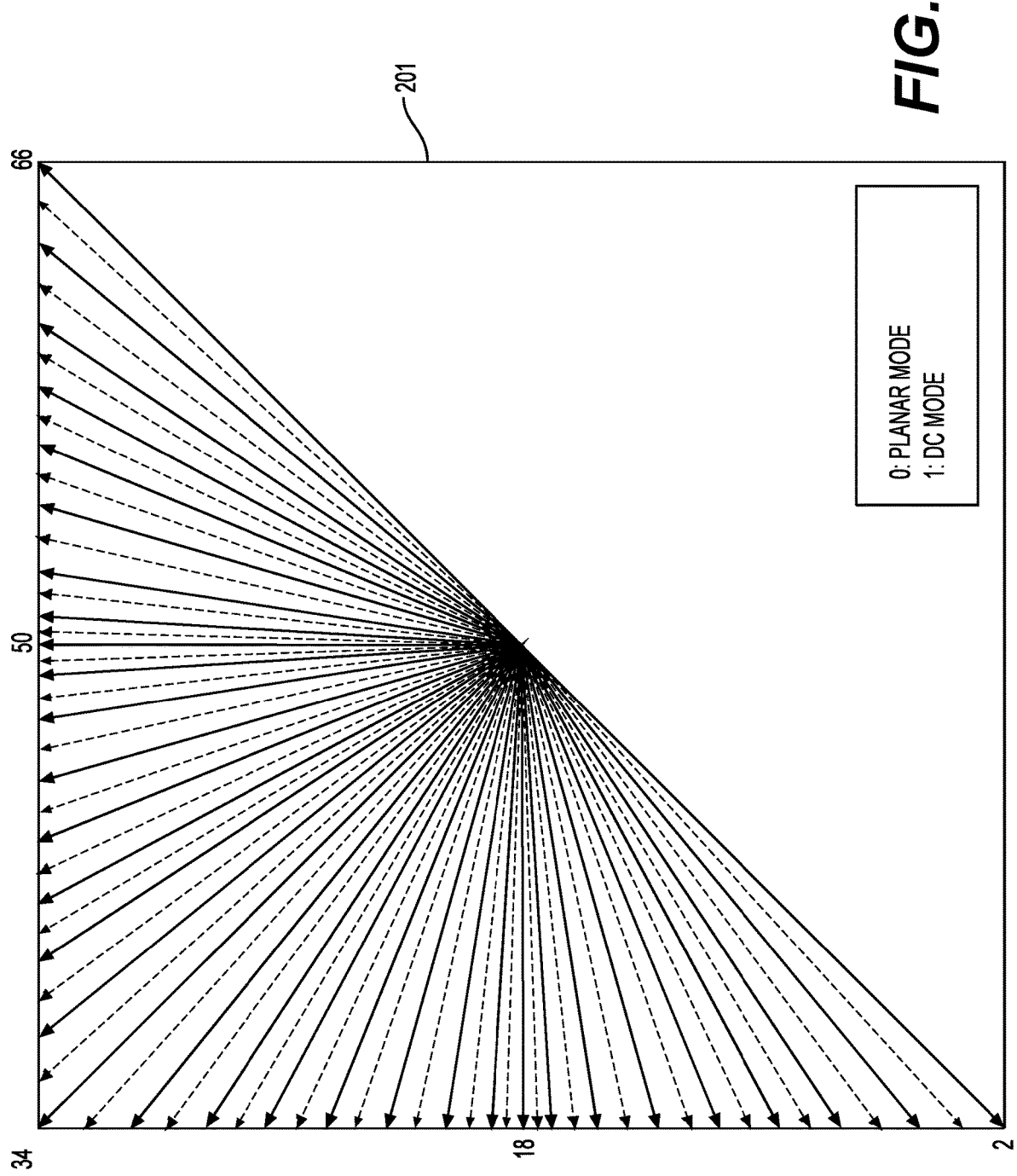
FIG. 2 is an illustration of exemplary intra prediction directions.
Figure 3:
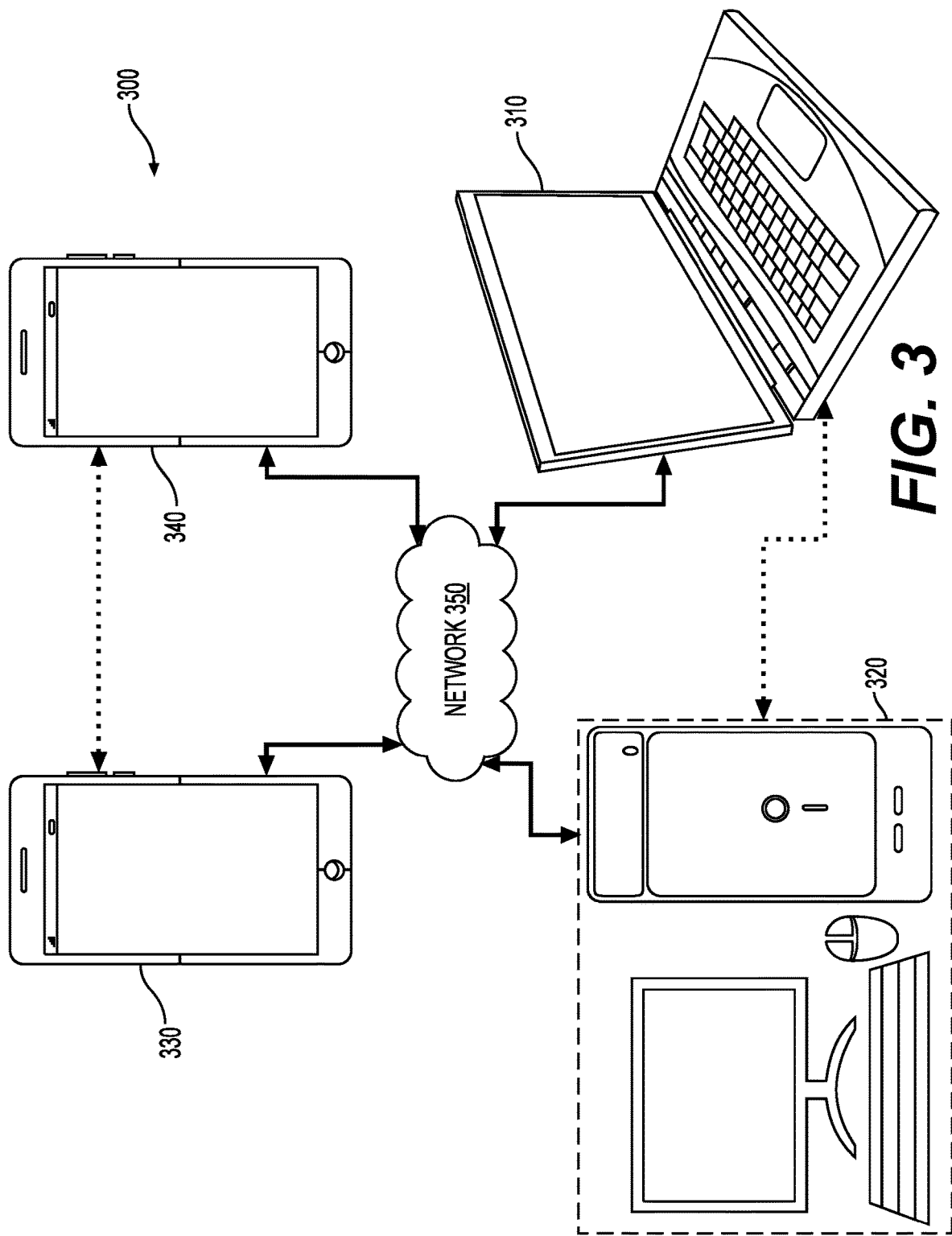
FIG. 3 is a schematic illustration of a simplified block diagram of a communication system (300) in accordance with an embodiment.

FIG. 3 illustrates a simplified block diagram of a communication system (300) according to an embodiment of the present disclosure. The communication system (300) includes a plurality of terminal devices that can communicate with each other, via, for example, a network (350). For example, the communication system (300) includes a first pair of terminal devices (310) and (320) interconnected via the network (350). In the FIG. 3 example, the first pair of terminal devices (310) and (320) performs unidirectional transmission of data. For example, the terminal device (310) may code video data (e.g., a stream of video pictures that are captured by the terminal device (310)) for transmission to the other terminal device (320) via the network (350). The encoded video data can be transmitted in the form of one or more coded video bitstreams. The terminal device (320) may receive the coded video data from the network (350), decode the coded video data to recover the video pictures and display video pictures according to the recovered video data. Unidirectional data transmission may be common in media serving applications and the like.

In another example, the communication system (300) includes a second pair of terminal devices (330) and (340) that performs bidirectional transmission of coded video data that may occur, for example, during videoconferencing. For bidirectional transmission of data, in an example, each terminal device of the terminal devices (330) and (340) may code video data (e.g., a stream of video pictures that are captured by the terminal device) for transmission to the other terminal device of the terminal devices (330) and (340) via the network (350). Each terminal device of the terminal devices (330) and (340) also may receive the coded video data transmitted by the other terminal device of the terminal devices (330) and (340), and may decode the coded video data to recover the video pictures and may display video pictures at an accessible display device according to the recovered video data.

In the FIG. 3 example, the terminal devices (310), (320), (330) and (340) may be illustrated as servers, personal computers and smart phones but the principles of the present disclosure may be not so limited. Embodiments of the present disclosure find application with laptop computers, tablet computers, media players and/or dedicated video conferencing equipment. The network (350) represents any number of networks that convey coded video data among the terminal devices (310), (320), (330) and (340), including for example wireline (wired) and/or wireless communication networks. The communication network (350) may exchange data in circuit-switched and/or packet-switched channels. Representative networks include telecommunications networks, local area networks, wide area networks and/or the Internet. For the purposes of the present discussion, the architecture and topology of the network (350) may be immaterial to the operation of the present disclosure unless explained herein below.

Figure 4:
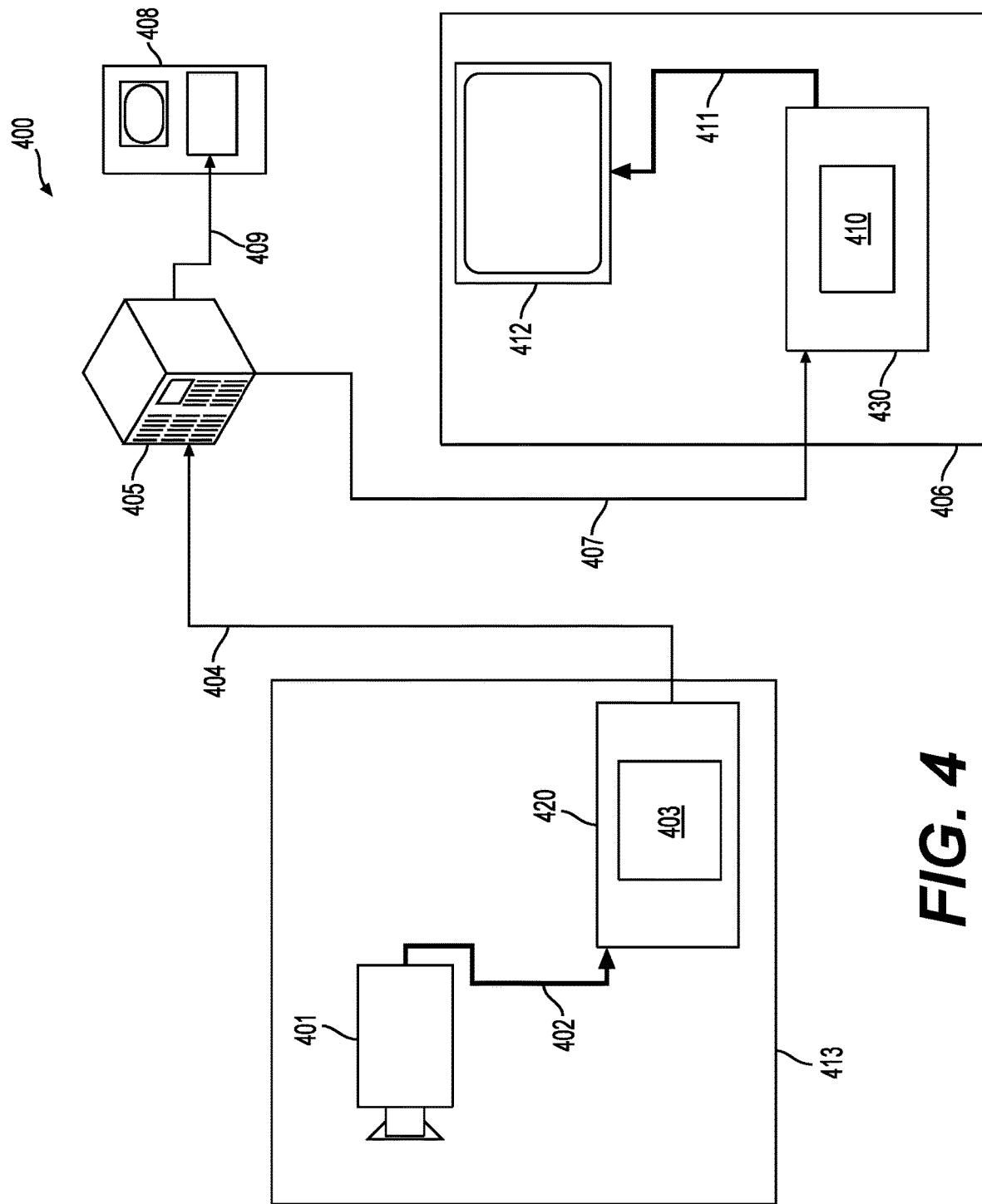
FIG. 4 is a schematic illustration of a simplified block diagram of a communication system (400) in accordance with an embodiment.

FIG. 4 illustrates, as an example for an application for the disclosed subject matter, the placement of a video encoder and a video decoder in a streaming environment. The disclosed subject matter can be equally applicable to other video enabled applications, including, for example, video conferencing, digital TV, storing of compressed video on digital media including CD, DVD, memory stick and the like, and so on.

A streaming system may include a capture subsystem (413), that can include a video source (401), for example a digital camera, creating for example a stream of video pictures (402) that are uncompressed. In an example, the stream of video pictures (402) includes samples that are taken by the digital camera. The stream of video pictures (402), depicted as a bold line to emphasize a high data volume when compared to encoded video data (404) (or coded video bitstreams), can be processed by an electronic device (420) that includes a video encoder (403) coupled to the video source (401). The video encoder (403) can include hardware, software, or a combination thereof to enable or implement aspects of the disclosed subject matter as described in more detail below. The encoded video data (404) (or encoded video bitstream (404)), depicted as a thin line to emphasize the lower data volume when compared to the stream of video pictures (402), can be stored on a streaming server (405) for future use. One or more streaming client subsystems, such as client subsystems (406) and (408) in FIG. 4 can access the streaming server (405) to retrieve copies (407) and (409) of the encoded video data (404). A client subsystem (406) can include a video decoder (410), for example, in an electronic device (430). The video decoder (410) decodes the incoming copy (407) of the encoded video data and creates an outgoing stream of video pictures (411) that can be rendered on a display (412) (e.g., display screen) or other rendering device (not depicted). In some streaming systems, the encoded video data (404), (407), and (409) (e.g., video bitstreams) can be encoded according to certain video coding/compression standards. Examples of those standards include ITU-T Recommendation H.265. In an example, a video coding standard under development is informally known as Versatile Video Coding (VVC). The disclosed subject matter may be used in the context of VVC.

It is noted that the electronic devices (420) and (430) can include other components (not shown). For example, the electronic device (420) can include a video decoder (not shown) and the electronic device (430) can include a video encoder (not shown) as well.

Figure 5:
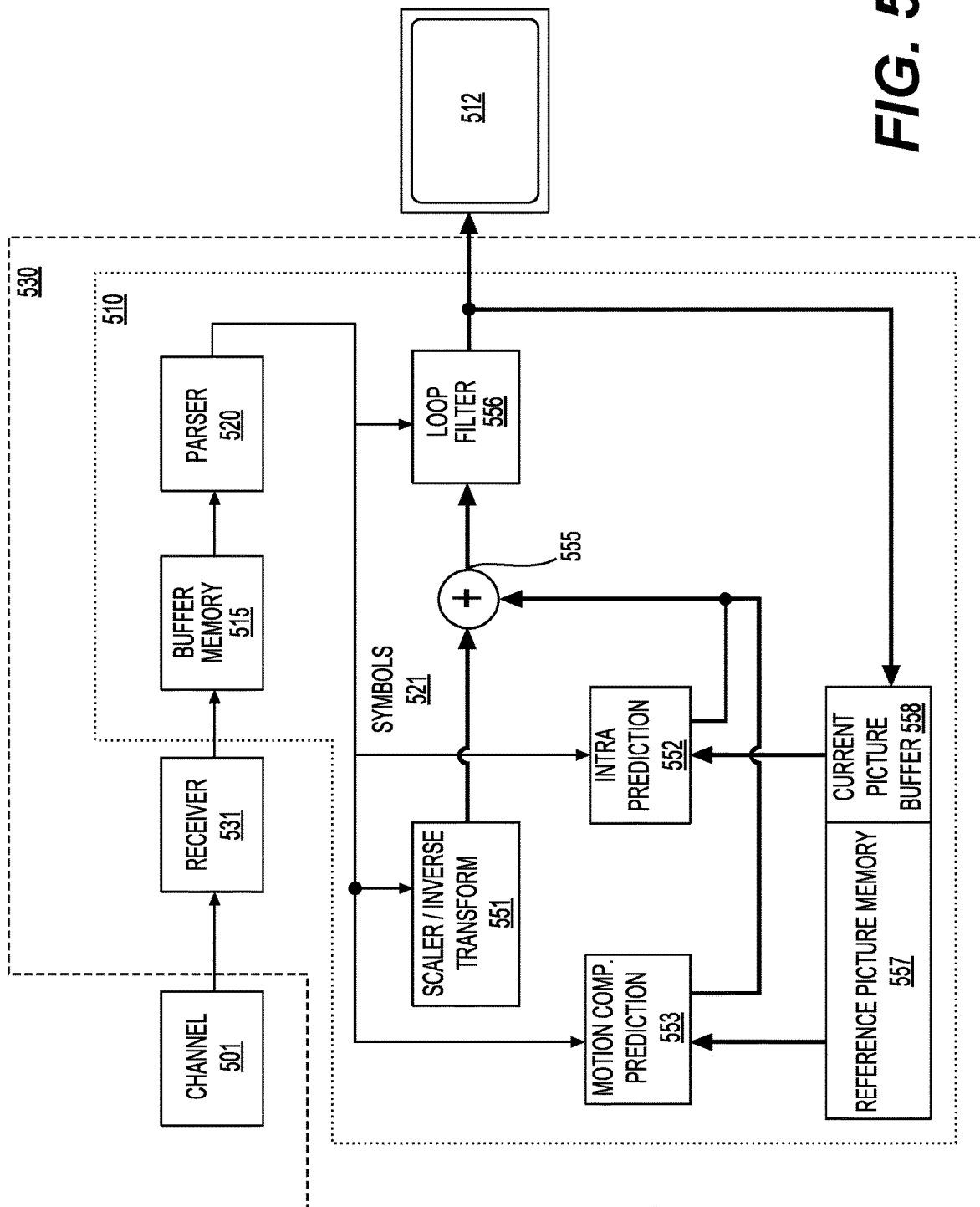
FIG. 5 is a schematic illustration of a simplified block diagram of a decoder in accordance with an embodiment.

FIG. 5 shows a block diagram of a video decoder (510) according to an embodiment of the present disclosure. The video decoder (510) can be included in an electronic device (530). The electronic device (530) can include a receiver (531) (e.g., receiving circuitry). The video decoder (510) can be used in the place of the video decoder (410) in the FIG. 4 example.

The receiver (531) may receive one or more coded video sequences to be decoded by the video decoder (510); in the same or another embodiment, one coded video sequence at a time, where the decoding of each coded video sequence is independent from other coded video sequences. The coded video sequence may be received from a channel (501), which may be a hardware/software link to a storage device which stores the encoded video data. The receiver (531) may receive the encoded video data with other data, for example, coded audio data and/or ancillary data streams, that may be forwarded to their respective using entities (not depicted). The receiver (531) may separate the coded video sequence from the other data. To combat network jitter, a buffer memory (515) may be coupled in between the receiver (531) and an entropy decoder/parser (520) ("parser (520)" henceforth). In certain applications, the buffer memory (515) is part of the video decoder (510). In others, it can be outside of the video decoder (510) (not depicted). In still others, there can be a buffer memory (not depicted) outside of the video decoder (510), for example to combat network jitter, and in addition another buffer memory (515) inside the video decoder (510), for example to handle playout timing. When the receiver (531) is receiving data from a store/forward device of sufficient bandwidth and controllability, or from an isosynchronous network, the buffer memory (515) may not be needed, or can be small. For use on best effort packet networks such as the Internet, the buffer memory (515) may be required, can be comparatively large and can be advantageously of adaptive size, and may at least partially be implemented in an operating system or similar elements (not depicted) outside of the video decoder (510).

The video decoder (510) may include the parser (520) to reconstruct symbols (521) from the coded video sequence. Categories of those symbols include information used to manage operation of the video decoder (510), and potentially information to control a rendering device such as a render device (512) (e.g., a display screen) that is not an integral part of the electronic device (530) but can be coupled to the electronic device (530), as was shown in FIG. 5. The control information for the rendering device(s) may be in the form of Supplemental Enhancement Information (SEI messages) or Video Usability Information (VUI) parameter set fragments (not depicted). The parser (520) may parse/entropy-decode the coded video sequence that is received. The coding of the coded video sequence can be in accordance with a video coding technology or standard, and can follow various principles, including variable length coding, Huffman coding, arithmetic coding with or without context sensitivity, and so forth. The parser (520) may extract from the coded video sequence, a set of subgroup parameters for at least one of the subgroups of pixels in the video decoder, based upon at least one parameter corresponding to the group. Subgroups can include Groups of Pictures (GOPs), pictures, tiles, slices, macroblocks, Coding Units (CUs), blocks, Transform Units (TUs), Prediction Units (PUs) and so forth. The parser (520) may also extract from the coded video sequence information such as transform coefficients, quantizer parameter values, motion vectors, and so forth.

The parser (520) may perform an entropy decoding/parsing operation on the video sequence received from the buffer memory (515), so as to create symbols (521).

Reconstruction of the symbols (521) can involve multiple different units depending on the type of the coded video picture or parts thereof (such as: inter and intra picture, inter and intra block), and other factors. Which units are involved, and how, can be controlled by the subgroup control information that was parsed from the coded video sequence by the parser (520). The flow of such subgroup control information between the parser (520) and the multiple units below is not depicted for clarity.

Beyond the functional blocks already mentioned, the video decoder (510) can be conceptually subdivided into a number of functional units as described below. In a practical implementation operating under commercial constraints, many of these units interact closely with each other and can, at least partly, be integrated into each other. However, for the purpose of describing the disclosed subject matter, the conceptual subdivision into the functional units below is appropriate.

A first unit is the scaler/inverse transform unit (551). The scaler/inverse transform unit (551) receives a quantized transform coefficient as well as control information, including which transform to use, block size, quantization factor, quantization scaling matrices, etc. as symbol(s) (521) from the parser (520). The scaler/inverse transform unit (551) can output blocks comprising sample values, that can be input into aggregator (555).

In some cases, the output samples of the scaler/inverse transform (551) can pertain to an intra coded block; that is: a block that is not using predictive information from previously reconstructed pictures, but can use predictive information from previously reconstructed parts of the current picture. Such predictive information can be provided by an intra picture prediction unit (552). In some cases, the intra picture prediction unit (552) generates a block of the same size and shape of the block under reconstruction, using surrounding already reconstructed information fetched from the current picture buffer (558). The current picture buffer (558) buffers, for example, partly reconstructed current picture and/or fully reconstructed current picture. The aggregator (555), in some cases, adds, on a per sample basis, the prediction information the intra prediction unit (552) has generated to the output sample information as provided by the scaler/inverse transform unit (551).

In other cases, the output samples of the scaler/inverse transform unit (551) can pertain to an inter coded, and potentially motion compensated block. In such a case, a motion compensation prediction unit (553) can access reference picture memory (557) to fetch samples used for prediction. After motion compensating the fetched samples in accordance with the symbols (521) pertaining to the block, these samples can be added by the aggregator (555) to the output of the scaler/inverse transform unit (551) (in this case called the residual samples or residual signal) so as to generate output sample information. The addresses within the reference picture memory (557) from where the motion compensation prediction unit (553) fetches prediction samples can be controlled by motion vectors, available to the motion compensation prediction unit (553) in the form of symbols (521) that can have, for example X, Y, and reference picture components. Motion compensation also can include interpolation of sample values as fetched from the reference picture memory (557) when sub-sample exact motion vectors are in use, motion vector prediction mechanisms, and so forth.

The output samples of the aggregator (555) can be subject to various loop filtering techniques in the loop filter unit (556). Video compression technologies can include in-loop filter technologies that are controlled by parameters included in the coded video sequence (also referred to as coded video bitstream) and made available to the loop filter unit (556) as symbols (521) from the parser (520), but can also be responsive to meta-information obtained during the decoding of previous (in decoding order) parts of the coded picture or coded video sequence, as well as responsive to previously reconstructed and loop-filtered sample values.

The output of the loop filter unit (556) can be a sample stream that can be output to the render device (512) as well as stored in the reference picture memory (557) for use in future inter-picture prediction.

Certain coded pictures, once fully reconstructed, can be used as reference pictures for future prediction. For example, once a coded picture corresponding to a current picture is fully reconstructed and the coded picture has been identified as a reference picture (by, for example, the parser (520)), the current picture buffer (558) can become a part of the reference picture memory (557), and a fresh current picture buffer can be reallocated before commencing the reconstruction of the following coded picture.

The video decoder (510) may perform decoding operations according to a predetermined video compression technology in a standard, such as ITU-T Rec. H.265. The coded video sequence may conform to a syntax specified by the video compression technology or standard being used, in the sense that the coded video sequence adheres to both the syntax of the video compression technology or standard and the profiles as documented in the video compression technology or standard. Specifically, a profile can select certain tools as the only tools available for use under that profile from all the tools available in the video compression technology or standard. Also necessary for compliance can be that the complexity of the coded video sequence is within bounds as defined by the level of the video compression technology or standard. In some cases, levels restrict the maximum picture size, maximum frame rate, maximum reconstruction sample rate (measured in, for example megasamples per second), maximum reference picture size, and so on. Limits set by levels can, in some cases, be further restricted through Hypothetical Reference Decoder (HRD) specifications and metadata for HRD buffer management signaled in the coded video sequence.

In an embodiment, the receiver (531) may receive additional (redundant) data with the encoded video. The additional data may be included as part of the coded video sequence(s). The additional data may be used by the video decoder (510) to properly decode the data and/or to more accurately reconstruct the original video data. Additional data can be in the form of, for example, temporal, spatial, or signal noise ratio (SNR) enhancement layers, redundant slices, redundant pictures, forward error correction codes, and so on.

Figure 6:
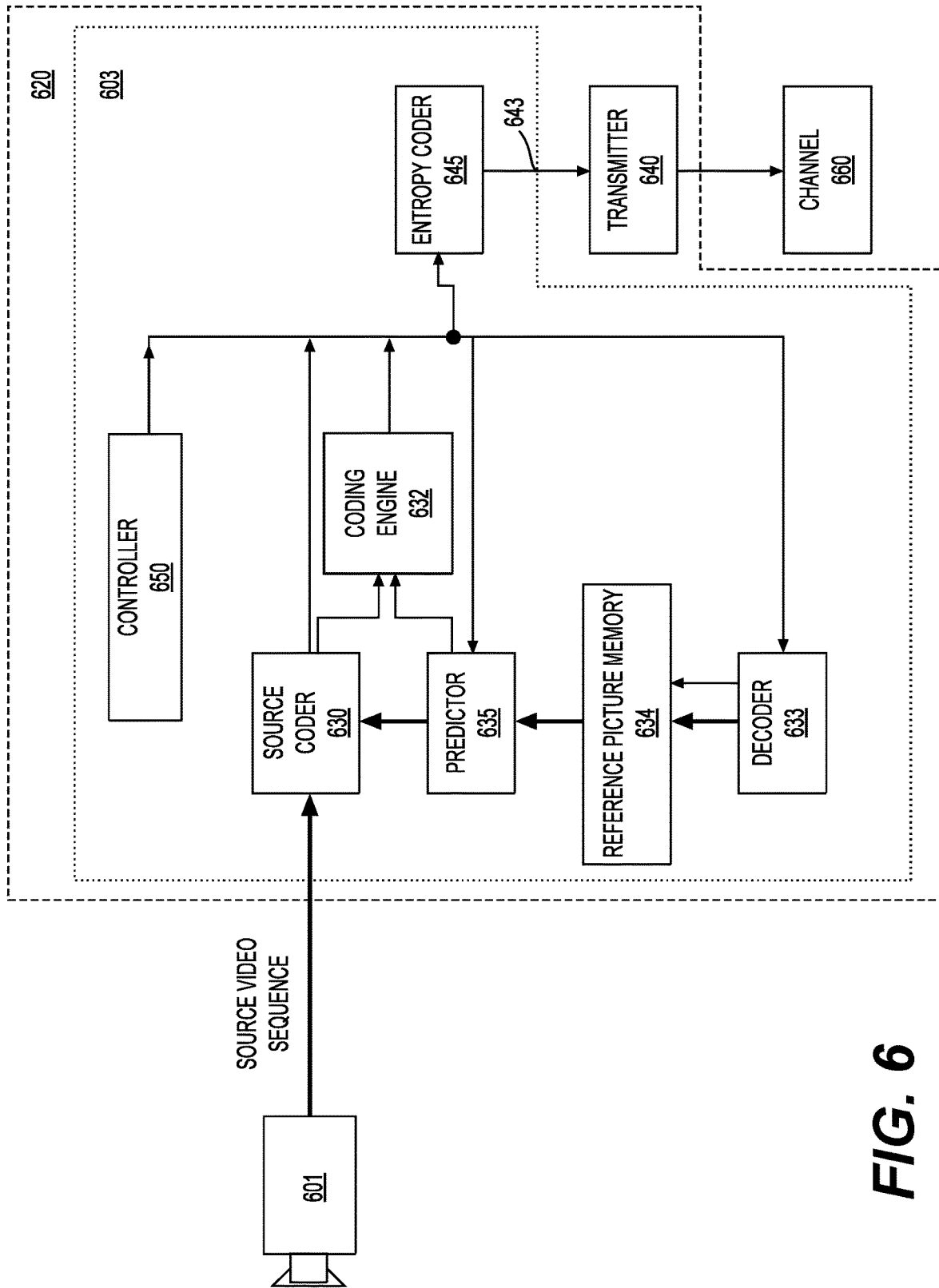
FIG. 6 is a schematic illustration of a simplified block diagram of an encoder in accordance with an embodiment.

FIG. 6 shows a block diagram of a video encoder (603) according to an embodiment of the present disclosure. The video encoder (603) is included in an electronic device (620). The electronic device (620) includes a transmitter (640) (e.g., transmitting circuitry). The video encoder (603) can be used in the place of the video encoder (403) in the FIG. 4 example.

The video encoder (603) may receive video samples from a video source (601) (that is not part of the electronic device (620) in the FIG. 6 example) that may capture video image(s) to be coded by the video encoder (603). In another example, the video source (601) is a part of the electronic device (620).

The video source (601) may provide the source video sequence to be coded by the video encoder (603) in the form of a digital video sample stream that can be of any suitable bit depth (for example: 8 bit, 10 bit, 12 bit, . . . ), any colorspace (for example, BT.601 Y CrCB, RGB, . . . ), and any suitable sampling structure (for example Y CrCb 4:2:0, Y CrCb 4:4:4). In a media serving system, the video source (601) may be a storage device storing previously prepared video. In a videoconferencing system, the video source (601) may be a camera that captures local image information as a video sequence. Video data may be provided as a plurality of individual pictures that impart motion when viewed in sequence. The pictures themselves may be organized as a spatial array of pixels, wherein each pixel can comprise one or more samples depending on the sampling structure, color space, etc. in use. A person skilled in the art can readily understand the relationship between pixels and samples. The description below focuses on samples.

According to an embodiment, the video encoder (603) may code and compress the pictures of the source video sequence into a coded video sequence (643) in real time or under any other time constraints as required by the application. Enforcing appropriate coding speed is one function of a controller (650). In some embodiments, the controller (650) controls other functional units as described below and is functionally coupled to the other functional units. The coupling is not depicted for clarity. Parameters set by the controller (650) can include rate control related parameters (picture skip, quantizer, lambda value of rate-distortion optimization techniques, . . . ), picture size, group of pictures (GOP) layout, maximum motion vector search range, and so forth. The controller (650) can be configured to have other suitable functions that pertain to the video encoder (603) optimized for a certain system design.

In some embodiments, the video encoder (603) is configured to operate in a coding loop. As an oversimplified description, in an example, the coding loop can include a source coder (630) (e.g., responsible for creating symbols, such as a symbol stream, based on an input picture to be coded, and a reference picture(s)), and a (local) decoder (633) embedded in the video encoder (603). The decoder (633) reconstructs the symbols to create the sample data in a similar manner as a (remote) decoder also would create (as any compression between symbols and coded video bitstream is lossless in the video compression technologies considered in the disclosed subject matter). The reconstructed sample stream (sample data) is input to the reference picture memory (634). As the decoding of a symbol stream leads to bit-exact results independent of decoder location (local or remote), the content in the reference picture memory (634) is also bit exact between the local encoder and remote encoder. In other words, the prediction part of an encoder "sees" as reference picture samples exactly the same sample values as a decoder would "see" when using prediction during decoding. This fundamental principle of reference picture synchronicity (and resulting drift, if synchronicity cannot be maintained, for example because of channel errors) is used in some related arts as well.

The operation of the "local" decoder (633) can be the same as of a "remote" decoder, such as the video decoder (510), which has already been described in detail above in conjunction with FIG. 5. Briefly referring also to FIG. 5, however, as symbols are available and encoding/decoding of symbols to a coded video sequence by an entropy coder (645) and the parser (520) can be lossless, the entropy decoding parts of the video decoder (510), including the buffer memory (515), and parser (520) may not be fully implemented in the local decoder (633).

An observation that can be made at this point is that any decoder technology except the parsing/entropy decoding that is present in a decoder also necessarily needs to be present, in substantially identical functional form, in a corresponding encoder. For this reason, the disclosed subject matter focuses on decoder operation. The description of encoder technologies can be abbreviated as they are the inverse of the comprehensively described decoder technologies. Only in certain areas a more detail description is required and provided below.

During operation, in some examples, the source coder (630) may perform motion compensated predictive coding, which codes an input picture predictively with reference to one or more previously coded picture from the video sequence that were designated as "reference pictures." In this manner, the coding engine (632) codes differences between pixel blocks of an input picture and pixel blocks of reference picture(s) that may be selected as prediction reference(s) to the input picture.

The local video decoder (633) may decode coded video data of pictures that may be designated as reference pictures, based on symbols created by the source coder (630). Operations of the coding engine (632) may advantageously be lossy processes. When the coded video data may be decoded at a video decoder (not shown in FIG. 6), the reconstructed video sequence typically may be a replica of the source video sequence with some errors. The local video decoder (633) replicates decoding processes that may be performed by the video decoder on reference pictures and may cause reconstructed reference pictures to be stored in the reference picture cache (634). In this manner, the video encoder (603) may store copies of reconstructed reference pictures locally that have common content as the reconstructed reference pictures that will be obtained by a far-end video decoder (absent transmission errors).

The predictor (635) may perform prediction searches for the coding engine (632). That is, for a new picture to be coded, the predictor (635) may search the reference picture memory (634) for sample data (as candidate reference pixel blocks) or certain metadata such as reference picture motion vectors, block shapes, and so on, that may serve as an appropriate prediction reference for the new pictures. The predictor (635) may operate on a sample block-by-pixel block basis to find appropriate prediction references. In some cases, as determined by search results obtained by the predictor (635), an input picture may have prediction references drawn from multiple reference pictures stored in the reference picture memory (634).

The controller (650) may manage coding operations of the source coder (630), including, for example, setting of parameters and subgroup parameters used for encoding the video data.

Output of all aforementioned functional units may be subjected to entropy coding in the entropy coder (645). The entropy coder (645) translates the symbols as generated by the various functional units into a coded video sequence, by lossless compressing the symbols according to technologies such as Huffman coding, variable length coding, arithmetic coding, and so forth.

The transmitter (640) may buffer the coded video sequence(s) as created by the entropy coder (645) to prepare for transmission via a communication channel (660), which may be a hardware/software link to a storage device which would store the encoded video data. The transmitter (640) may merge coded video data from the video coder (603) with other data to be transmitted, for example, coded audio data and/or ancillary data streams (sources not shown).

The controller (650) may manage operation of the video encoder (603). During coding, the controller (650) may assign to each coded picture a certain coded picture type, which may affect the coding techniques that may be applied to the respective picture. For example, pictures often may be assigned as one of the following picture types:

An Intra Picture (I picture) may be one that may be coded and decoded without using any other picture in the sequence as a source of prediction. Some video codecs allow for different types of intra pictures, including, for example Independent Decoder Refresh ("IDR") Pictures. A person skilled in the art is aware of those variants of I pictures and their respective applications and features.

A predictive picture (P picture) may be one that may be coded and decoded using intra prediction or inter prediction using at most one motion vector and reference index to predict the sample values of each block.

A bi-directionally predictive picture (B Picture) may be one that may be coded and decoded using intra prediction or inter prediction using at most two motion vectors and reference indices to predict the sample values of each block. Similarly, multiple-predictive pictures can use more than two reference pictures and associated metadata for the reconstruction of a single block.

Source pictures commonly may be subdivided spatially into a plurality of sample blocks (for example, blocks of 4×4, 8×8, 4×8, or 16×16 samples each) and coded on a block-by-block basis. Blocks may be coded predictively with reference to other (already coded) blocks as determined by the coding assignment applied to the blocks' respective pictures. For example, blocks of I pictures may be coded non-predictively or they may be coded predictively with reference to already coded blocks of the same picture (spatial prediction or intra prediction). Pixel blocks of P pictures may be coded predictively, via spatial prediction or via temporal prediction with reference to one previously coded reference picture. Blocks of B pictures may be coded predictively, via spatial prediction or via temporal prediction with reference to one or two previously coded reference pictures.

The video encoder (603) may perform coding operations according to a predetermined video coding technology or standard, such as ITU-T Rec. H.265. In its operation, the video encoder (603) may perform various compression operations, including predictive coding operations that exploit temporal and spatial redundancies in the input video sequence. The coded video data, therefore, may conform to a syntax specified by the video coding technology or standard being used.

In an embodiment, the transmitter (640) may transmit additional data with the encoded video. The source coder (630) may include such data as part of the coded video sequence. Additional data may comprise temporal/spatial/SNR enhancement layers, other forms of redundant data such as redundant pictures and slices, SEI messages, VUI parameter set fragments, and so on.

A video may be captured as a plurality of source pictures (video pictures) in a temporal sequence. Intra-picture prediction (often abbreviated to intra prediction) makes use of spatial correlation in a given picture, and inter-picture prediction makes uses of the (temporal or other) correlation between the pictures. In an example, a specific picture under encoding/decoding, which is referred to as a current picture, is partitioned into blocks. When a block in the current picture is similar to a reference block in a previously coded and still buffered reference picture in the video, the block in the current picture can be coded by a vector that is referred to as a motion vector. The motion vector points to the reference block in the reference picture, and can have a third dimension identifying the reference picture, in case multiple reference pictures are in use.

In some embodiments, a bi-prediction technique can be used in the inter-picture prediction. According to the bi-prediction technique, two reference pictures, such as a first reference picture and a second reference picture that are both prior in decoding order to the current picture in the video (but may be in the past and future, respectively, in display order) are used. A block in the current picture can be coded by a first motion vector that points to a first reference block in the first reference picture, and a second motion vector that points to a second reference block in the second reference picture. The block can be predicted by a combination of the first reference block and the second reference block.

Further, a merge mode technique can be used in the inter-picture prediction to improve coding efficiency.

According to some embodiments of the disclosure, predictions, such as inter-picture predictions and intra-picture predictions are performed in the unit of blocks. For example, according to the HEVC standard, a picture in a sequence of video pictures is partitioned into coding tree units (CTU) for compression, the CTUs in a picture have the same size, such as 64×64 pixels, 32×32 pixels, or 16×16 pixels. In general, a CTU includes three coding tree blocks (CTBs), which are one luma CTB and two chroma CTBs. Each CTU can be recursively quadtree split into one or multiple coding units (CUs). For example, a CTU of 64×64 pixels can be split into one CU of 64×64 pixels, or 4 CUs of 32×32 pixels, or 16 CUs of 16×16 pixels. In an example, each CU is analyzed to determine a prediction type for the CU, such as an inter prediction type or an intra prediction type. The CU is split into one or more prediction units (PUs) depending on the temporal and/or spatial predictability. Generally, each PU includes a luma prediction block (PB), and two chroma PBs. In an embodiment, a prediction operation in coding (encoding/decoding) is performed in the unit of a prediction block. Using a luma prediction block as an example of a prediction block, the prediction block includes a matrix of values (e.g., luma values) for pixels, such as 8×8 pixels, 16×16 pixels, 8×16 pixels, 16×8 pixels, and the like.

Figure 7:
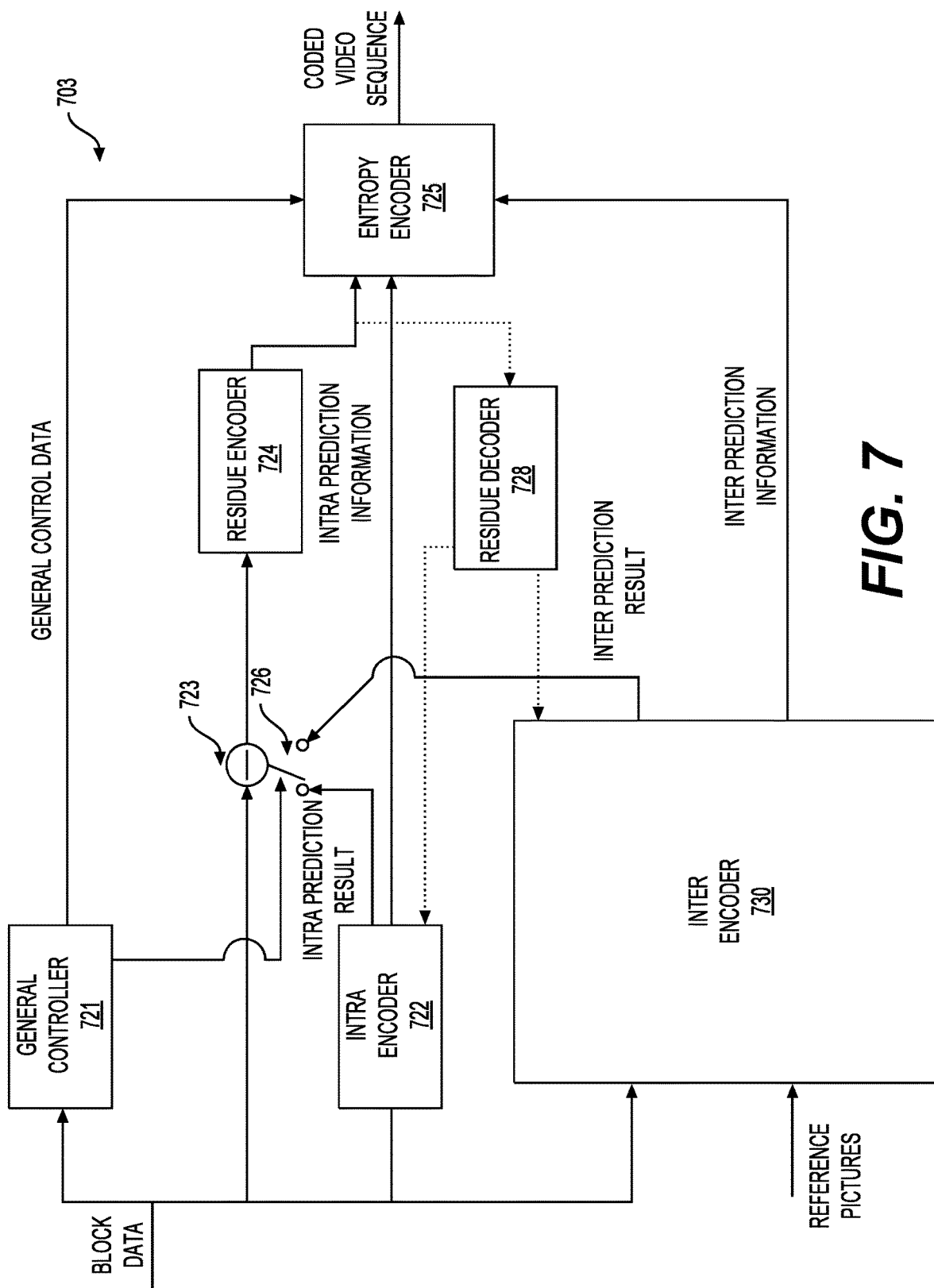
FIG. 7 shows a block diagram of an encoder in accordance with another embodiment.

FIG. 7 shows a diagram of a video encoder (703) according to another embodiment of the disclosure. The video encoder (703) is configured to receive a processing block (e.g., a prediction block) of sample values within a current video picture in a sequence of video pictures, and encode the processing block into a coded picture that is part of a coded video sequence. In an example, the video encoder (703) is used in the place of the video encoder (403) in the FIG. 4 example.

In an HEVC example, the video encoder (703) receives a matrix of sample values for a processing block, such as a prediction block of 8×8 samples, and the like. The video encoder (703) determines whether the processing block is best coded using intra mode, inter mode, or bi-prediction mode using, for example, rate-distortion optimization. When the processing block is to be coded in intra mode, the video encoder (703) may use an intra prediction technique to encode the processing block into the coded picture; and when the processing block is to be coded in inter mode or bi-prediction mode, the video encoder (703) may use an inter prediction or bi-prediction technique, respectively, to encode the processing block into the coded picture. In certain video coding technologies, merge mode can be an inter picture prediction submode where the motion vector is derived from one or more motion vector predictors without the benefit of a coded motion vector component outside the predictors. In certain other video coding technologies, a motion vector component applicable to the subject block may be present. In an example, the video encoder (703) includes other components, such as a mode decision module (not shown) to determine the mode of the processing blocks.

In the FIG. 7 example, the video encoder (703) includes the inter encoder (730), an intra encoder (722), a residue calculator (723), a switch (726), a residue encoder (724), a general controller (721), and an entropy encoder (725) coupled together as shown in FIG. 7.

The inter encoder (730) is configured to receive the samples of the current block (e.g., a processing block), compare the block to one or more reference blocks in reference pictures (e.g., blocks in previous pictures and later pictures), generate inter prediction information (e.g., description of redundant information according to inter encoding technique, motion vectors, merge mode information), and calculate inter prediction results (e.g., predicted block) based on the inter prediction information using any suitable technique. In some examples, the reference pictures are decoded reference pictures that are decoded based on the encoded video information.

The intra encoder (722) is configured to receive the samples of the current block (e.g., a processing block), in some cases compare the block to blocks already coded in the same picture, generate quantized coefficients after transform, and in some cases also intra prediction information (e.g., an intra prediction direction information according to one or more intra encoding techniques). In an example, the intra encoder (722) also calculates intra prediction results (e.g., predicted block) based on the intra prediction information and reference blocks in the same picture.

The general controller (721) is configured to determine general control data and control other components of the video encoder (703) based on the general control data. In an example, the general controller (721) determines the mode of the block, and provides a control signal to the switch (726) based on the mode. For example, when the mode is the intra mode, the general controller (721) controls the switch (726) to select the intra mode result for use by the residue calculator (723), and controls the entropy encoder (725) to select the intra prediction information and include the intra prediction information in the bitstream; and when the mode is the inter mode, the general controller (721) controls the switch (726) to select the inter prediction result for use by the residue calculator (723), and controls the entropy encoder (725) to select the inter prediction information and include the inter prediction information in the bitstream.

The residue calculator (723) is configured to calculate a difference (residue data) between the received block and prediction results selected from the intra encoder (722) or the inter encoder (730). The residue encoder (724) is configured to operate based on the residue data to encode the residue data to generate the transform coefficients. In an example, the residue encoder (724) is configured to convert the residue data from a spatial domain to a frequency domain, and generate the transform coefficients. The transform coefficients are then subject to quantization processing to obtain quantized transform coefficients. In various embodiments, the video encoder (703) also includes a residue decoder (728). The residue decoder (728) is configured to perform inverse-transform, and generate the decoded residue data. The decoded residue data can be suitably used by the intra encoder (722) and the inter encoder (730). For example, the inter encoder (730) can generate decoded blocks based on the decoded residue data and inter prediction information, and the intra encoder (722) can generate decoded blocks based on the decoded residue data and the intra prediction information. The decoded blocks are suitably processed to generate decoded pictures and the decoded pictures can be buffered in a memory circuit (not shown) and used as reference pictures in some examples.

The entropy encoder (725) is configured to format the bitstream to include the encoded block. The entropy encoder (725) is configured to include various information according to a suitable standard, such as the HEVC standard. In an example, the entropy encoder (725) is configured to include the general control data, the selected prediction information (e.g., intra prediction information or inter prediction information), the residue information, and other suitable information in the bitstream. Note that, according to the disclosed subject matter, when coding a block in the merge submode of either inter mode or bi-prediction mode, there is no residue information.

Figure 8:
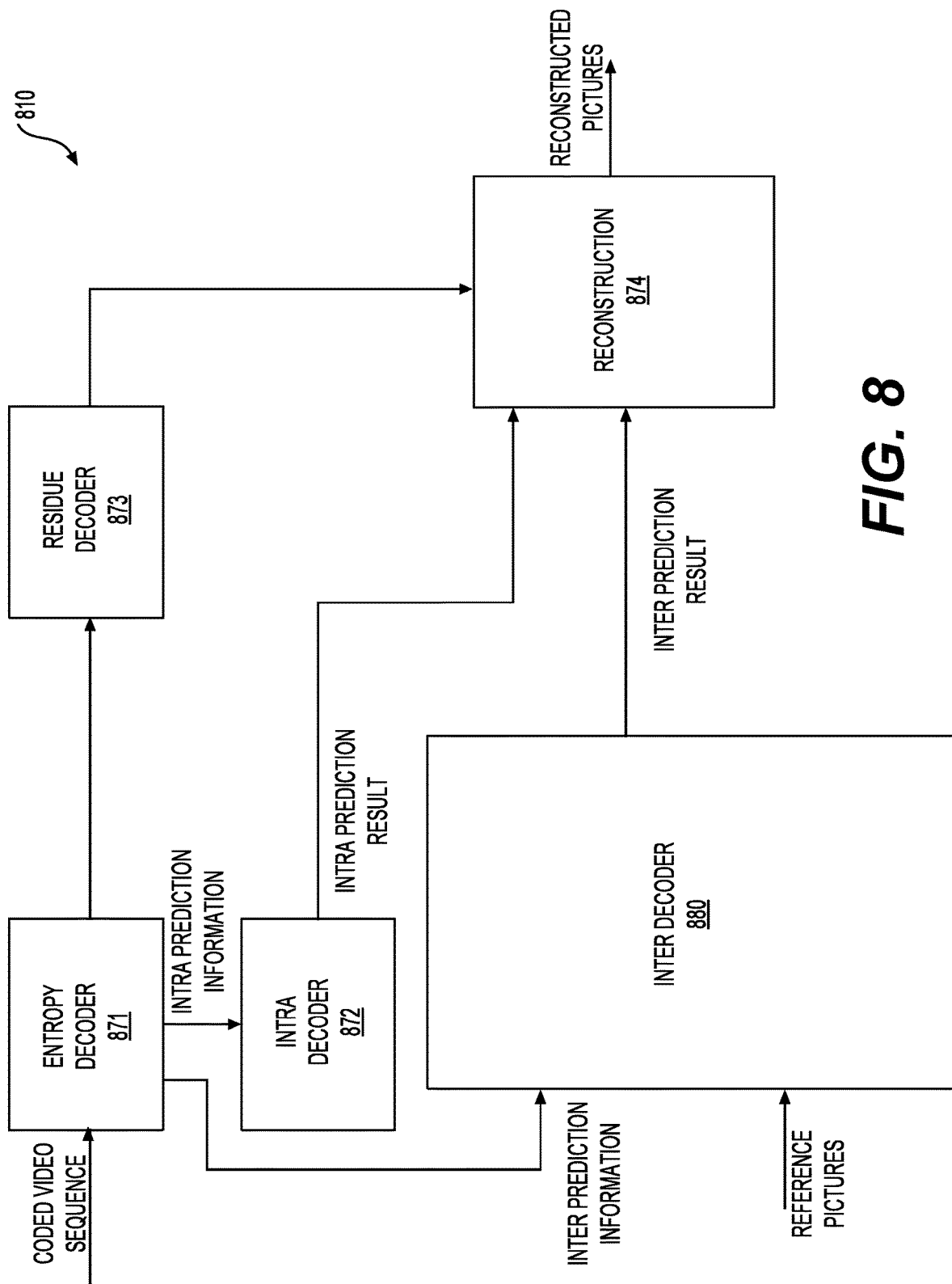
FIG. 8 shows a block diagram of a decoder in accordance with another embodiment.

FIG. 8 shows a diagram of a video decoder (810) according to another embodiment of the disclosure. The video decoder (810) is configured to receive coded pictures that are part of a coded video sequence, and decode the coded pictures to generate reconstructed pictures. In an example, the video decoder (810) is used in the place of the video decoder (410) in the FIG. 4 example.

In the FIG. 8 example, the video decoder (810) includes an entropy decoder (871), an inter decoder (880), a residue decoder (873), a reconstruction module (874), and an intra decoder (872) coupled together as shown in FIG. 8.

The entropy decoder (871) can be configured to reconstruct, from the coded picture, certain symbols that represent the syntax elements of which the coded picture is made up. Such symbols can include, for example, the mode in which a block is coded (such as, for example, intra mode, inter mode, bi-predicted mode, the latter two in merge submode or another submode), prediction information (such as, for example, intra prediction information or inter prediction information) that can identify certain sample or metadata that is used for prediction by the intra decoder (872) or the inter decoder (880), respectively, residual information in the form of, for example, quantized transform coefficients, and the like. In an example, when the prediction mode is inter or bi-predicted mode, the inter prediction information is provided to the inter decoder (880); and when the prediction type is the intra prediction type, the intra prediction information is provided to the intra decoder (872). The residual information can be subject to inverse quantization and is provided to the residue decoder (873).

The inter decoder (880) is configured to receive the inter prediction information, and generate inter prediction results based on the inter prediction information.

The intra decoder (872) is configured to receive the intra prediction information, and generate prediction results based on the intra prediction information.

The residue decoder (873) is configured to perform inverse quantization to extract de-quantized transform coefficients, and process the de-quantized transform coefficients to convert the residual from the frequency domain to the spatial domain. The residue decoder (873) may also require certain control information (to include the Quantizer Parameter (QP)), and that information may be provided by the entropy decoder (871) (data path not depicted as this may be low volume control information only).

The reconstruction module (874) is configured to combine, in the spatial domain, the residual as output by the residue decoder (873) and the prediction results (as output by the inter or intra prediction modules as the case may be) to form a reconstructed block, that may be part of the reconstructed picture, which in turn may be part of the reconstructed video. It is noted that other suitable operations, such as a deblocking operation and the like, can be performed to improve the visual quality.

It is noted that the video encoders (403), (603), and (703), and the video decoders (410), (510), and (810) can be implemented using any suitable technique. In an embodiment, the video encoders (403), (603), and (703), and the video decoders (410), (510), and (810) can be implemented using one or more integrated circuits. In another embodiment, the video encoders (403), (603), and (603), and the video decoders (410), (510), and (810) can be implemented using one or more processors that execute software instructions.

According to some aspects of the disclosure, a coding mode that is referred to as palette based coding mode can be used in addition to the inter prediction mode and the intra prediction mode. The present disclosure provides techniques to simplify palette based coding mode with local dual tree coding structure.

In some examples, screen contents have specific characteristics, and coding tools can be developed for screen coding. The coding tools for screen coding can achieve significant gains in coding efficiency. The palette based coding mode can represent block of pixels using indices to a palette that includes major colors of the block. The palette and the indices can be encoded by exploiting spatial redundancy.

Specifically, in some embodiments, a palette is defined as a lookup table of entries that can associate indices with pixel values. In some examples, a pixel value includes one or more values corresponding to color components. In an example, a pixel value can include three values respectively representing three color components. In another example, for a monochrome palette, a pixel value includes a value representing a single color component.

In some embodiments, a block of pixels can be encoded based on the palette, and the coding mode using the palette is referred to as palette based coding mode. The palette based coding mode is adopted in some video coding standards, such as VVC and the like.

According to some embodiments, the palette based coding mode is a standalone coding mode. In an embodiment, the palette based coding mode is implemented as a coding unit (e.g., palette based encoder, palette based decoder and the like) that is separately from the intra encoder (722), the inter encoder (730), the intra decoder (872), the inter decoder (870). In an example, the palette based coding mode is implemented as separate hardware circuitry from the intra encoder (722), the inter encoder (730), the intra decoder (872), the inter decoder (870). In another example, the palette based coding mode is implemented as a separate software module from software modules for the intra encoder (722), the inter encoder (730), the intra decoder (872), the inter decoder (870). The software module for palette based coding mode and other software modules can be executed by a same processor or different processors.

According to some aspects of the disclosure, a palette based coding mode generally includes two parts: a first part of coding methods for the palette and a second part of coding methods for the samples using the palette. The first part can include major color selection and palette coding. The second part can include palette index coding, run length coding, and escape pixel coding.

In some examples, a palette based encoder can encode a block of video data by determining the palette for the block (e.g., coding the palette explicitly, predicting the palette, a combination of signaling and predicting, and the like), locating an entry in the palette to represent one or more of the pixel values, and encoding the block with index values that indicate the entries in the palette used to represent the pixel values of the block. In some examples, the palette based encoder may signal the palette and/or the index values in an encoded bitstream. In turn, the palette based decoder may obtain, from an encoded bitstream, a palette for a block, as well as index values for the individual pixels of the block. In some other examples, the palette can be predicted, and the palette based encoder can signal the index values in the encoded bitstream without signaling the palette and the palette based encoder can predict the palette and receive the index values in the encoded bitstream. Then, the palette based decoder can relate the index values of the pixels to entries of the palette that provide pixel values. The palette based decoder can reconstruct the various pixels of the block based on the pixel values associated with the index values.

According to some embodiments, a palette may include the most dominant pixel values in a given block. For example, the most dominant pixel values may include one or more pixel values that occur most frequently within the given block. Additionally, in some examples, a threshold value (e.g., number of pixels having the pixel value) can be used to determine whether a pixel value is to be included as one of the most dominant pixel values in the block.

In some embodiments, a histogram based algorithm is used to classify pixel values of pixels in a block in order to form a palette. In some examples, the most significant L peak values in the histogram can be selected as major colors (L is a positive integer). In an example, the pixel values that are close to a major color can be quantized to the major color. In some examples, pixels which do not belong to any major colors are referred to as escape pixels. The escape pixels can be quantized before coding. In some embodiments, for lossless coding, the quantization processes are not performed.

Further, in some embodiments, for each pixel, a color index is assigned to indicate which color the pixel belongs to. In some examples, if L major colors are used, 0 to (L−1) can be used as color indices for the major colors, and 0 to (L−1) can be referred to as a major color set. For those pixels whose major color indexes do not exist, a special index (e.g., index N other than 0 to (L−1)) is assigned to them and these pixels are called 'escaped pixels'.

Generally, the palette is implemented as a color lookup table. The color lookup table includes a plurality of entries. Each entry associates a color index with a color (e.g., major color). In some examples, a single palette is used to code both luma and chroma components. Each entry can represent a specific RGB(YUV) color using three color components. For example, a palette can have entry 1 with (R, G, B)=(0, 0, 0) that represents pure black color, and can have entry 0 with (R, G, B)=(2, 10, 200) that represents a bluish color. It is noted that when the video format is 420, the chroma plane are up sampled to generate the color lookup table for palette.

In some embodiments, palette based coding is performed on a CU basis. In an example, for a current CU, a color lookup table is derived which includes the most dominant pixel values in the current CU. In some examples, the size and the elements of the color lookup table can be transmitted. In some other examples, the size and the elements of the color lookup table can be predictively coded using the size and/or the elements of the color lookup table of other CUs.

According to some aspects of the disclosure, palette prediction can be performed based on a palette predictor list. In an example, a palette predictor list can include multiple palettes that are used for other CUs. To code the current palette using the palette predictor list as a reference, a binary vector is used to indicate whether each entry in the palette predictor list is reused in the current palette.

In some examples (e.g, HEVC SCC), a palette predictor list stores the previously coded palette entries as references to predict the current palette. The palette predictor list is updated after each palette mode CU. In an example, the palette predictor list operates in a similar manner as a least recently used cache. The latest palette can be inserted at the beginning of the palette predictor list and the entries from the farthest CUs in scan order are discarded if the list size exceeds a threshold. In some examples, the maximum allowed palette predictor size and palette size are either signaled in a high level syntax, or as defined values agreed by both encoder and decoders. In an embodiment, the upper bound of the size of the palette predictor list is (directly or indirectly) signaled in the SPS. For example, the palette predictor list can have roughly twice the size of the size limit for a palette. In some examples, the palette predictor list is also referred to as history palette predictor list (HPPL). In an example, in SPS, the maximum predictor palette size is signaled to be 63, the maximum palette size is signaled to be 31. In another example, these two values are assumed by encoder and decoder without signaling.

In some embodiments, entries in the palette prediction list can have respectively reuse flags. When a reuse flag for an entry is true (e.g., "1"), the entry is referred to as a reused entry. Color components of the reused entries in the palette prediction list can be copied to the color lookup table of the current palette. The reused entries are placed at the beginning of the current palette in a manner to maintain their order in the palette predictor list. The reused entries in the current palette can be followed by new palette entries which are not in the palette predictor list. The new palette entries can be signaled. Each new palette entry can include for example three color components.

In some embodiments, a palette initializer with predefined entries can be used to initialize the palette predictor list. The use of palette initializer can result in improved coding efficiency in some scenarios. A palette initializer can be signaled, for example in the picture parameter set (PPS), in the sequence parameter set (SPS), and the like.

Color indices can be encoded as below. After classification, the pixels of the block can be converted into the color indices according to the selected major color set. In some examples, a predictive coding method can be applied to the color indices, where a pixel line can be predicted by multiple different modes (e.g., three different modes), including a horizontal mode (e.g., a copy index mode), a vertical mode (e.g., a copy above mode), and a normal mode (e.g., an escape mode). In some examples, two index scan orders (e.g., a horizontal traverse scan and a vertical traverse scan) are used when coding the color indices. An index rotation flag can be signaled to indicate which of the two index scan orders is used.

In the copy index mode, starting from a first pixel, one or more consecutive indices can be copied from the first pixel. A color index of the first pixel can be signaled.

In the copy above mode, one or more consecutive color indices can be copied from an above pixel line, for example, a pixel line that is above a current pixel line.

In the escape mode, when an escape pixel is encountered, for example, signaled by the largest index (e.g., N) in major color set, a corresponding pixel value can be coded after the largest index (e.g., N). There may be multiple escape pixels with different color values in the CU. For different escape pixel locations, the pixel values of the escape pixels may be different.

For each copy index mode, an index value can be signaled. The index signaling can be grouped in the front (or beginning), for example, to improve a context-adaptive binary arithmetic coding (CABAC) throughput. Similarly, the pixel values of the escape pixels can be signaled in the back, for example, to improve the CABAC throughput. The copy index mode and the copy above mode can be signaled between the indices coding and the escape coding.

In an embodiment, the coding tree scheme supports the ability for a luma component and corresponding chroma component(s) to have separate block tree structures. In an example, for P and B slices, luma and chroma CTBs in a CTU share a same coding tree structure (e.g., a single tree). For I slices, luma and chroma CTBs in a CTU can have separate block tree structures (e.g., dual tree), and the partition case of the CTU using separate block tree structures is referred to as dual tree partition. In an example, when dual tree partition is applied, a luma CTB can be partitioned into luma CUs by a luma coding tree structure, and chroma CTBs can be partitioned into chroma CUs by a chroma coding tree structure.

In some examples, such as in JVET, samples of the chroma component can have an independent or a separate split tree structure (or coding tree structure) as compared to the luma component. The separate coding tree structure can start from a CTU level, and the dual tree structure from the CTU level is referred to as global dual tree structure in some examples. In an example, a chroma CU (e.g., a CU that includes only two chroma components) is larger than a luma counterpart of the chroma CU at a corresponding sample location.

In some examples of the CTU level dual-tree (global dual tree structure), the maximum allowed predictor palette size and palette size are reduced, for example, in half so that for each channel (of luma or chroma), the complexity is reduced. For example, in case of single tree coding, luma and chroma palette coded blocks are jointly coded, and the maximum allowed predictor palette size is 63 entries and the maximum allowed palette size is 31 entries. In case of dual-tree coding, for the luma palette coded blocks, the maximum allowed predictor palette size is 31 entries and the maximum allowed palette size is 15 entries; and for the chroma palette coded blocks, the maximum allowed predictor palette size is 31 entries and the maximum allowed palette size is 15 entries.

According to some aspects of the disclosure, a technique that is referred to as local dual tree is used to avoid use of small chroma blocks (such as such as a CU with smaller than 4×4 chroma samples). In an example, when some conditions are met (such as a parent CU size is smaller than or equal to some threshold that can cause chroma block having smaller than 4×4 samples), local dual tree technique can be triggered. From then, luma and chroma coding can be separated for the CU in a way similar as dual-tree at CTU level.

According to an aspect of the disclosure, when split tree structures are used, the luma components can be coded in one of intra prediction mode, IBC mode and palette based coding mode and the chroma components can be coded in one of intra prediction mode and palette based coding mode. However, the use of local dual-tree complicates operations in the palette based coding mode. For example, a block of the local dual tree structure may have neighboring blocks in the single tree structure. The same palette predictor list may be used by the block of the local dual tree structure and neighboring blocks in the single tree structure. The update of the palette predictor list can be complicated.

Aspects of the disclosure provide techniques that simplify the palette based coding with local dual tree coding structure.

According to an aspect of the disclosure, when some conditions are true, the palette predictor list update process is disabled or by-passed for palette mode coding. In some examples, when local dual-tree can be triggered, and blocks of the local dual tree structure are coded in palette based coding mode, update process of the palette predictor list can be disabled. Thus, under local dual tree structure, for luma blocks that are coded in the palette based coding mode and/or chroma blocks that are coded in the palette based coding mode, the palette entries of those blocks are not used to update the palette entries in the palette predictor list.

In an embodiment, the trigger of the local dual tree can be detected. In an example, when the local dual tree is triggered, the palette predictor list is not updated based on the chroma blocks that are coded in the palette based coding mode under the local dual tree structure and is not updated based on luma blocks that are coded in the palette based coding mode under the local dual tree structure. In another example, when the local dual tree is triggered, the palette predictor list is not updated based on the luma blocks that are coded in the palette based coding mode under the local due tree structure, and can be updated based on the chroma blocks that are coded in the palette based coding mode under the local dual tree structure. In another example, when the local dual tree is triggered, the palette predictor list is not updated based on the chroma blocks that are coded in the palette based coding mode under the local dual tree structure and can be updated based on luma blocks that are coded in the palette based coding mode under the local dual tree structure.

Specifically, in an example, a variable denoted by localDualTree is used to detect whether local dual tree can be triggered. In an example, the variable localDualTree is derived according to (Eq. 1):

$$\text{localDualTree=treeType !=SINGLE\_TREE \&\& (slice\_type !=I||(slice\_type==I \&\& qtbtt\_dual\_tree\_intra\_flag==0)) ? 1:0} \quad \text{(Eq. 1)}$$

where treeType denotes the type of the split tree structure (e.g., SINGLE_TREE, DUAL_TREE_LUMA, DUAL_TREE_CHROMA, and the like), slice_type denote the type (e.g., I, P or B) of the current slice, and qtbtt_dual_tree_intra_flag denotes the flag for global dual tree. When the variable localDualTree is equal to 1, local dual tree can be triggered and detected; when the variable localDualTree is equal to 0, local dual tree is not triggered.

FIG. 9 shows a syntax example (900) for updating a palette prediction list in some examples. In some examples, when the localDualtree is equal to 0, the palette prediction list can be updated according to the syntax example (900); and when the localDualtree is equal to 1, the update process according to the syntax example (900) is skipped.

In an example, for a palette coded block under single tree structure, the palette prediction list can be updated based on block. For example, treeType is equal to SINGLE_TREE, thus the localDualtree is equal to 0. Further, the variable startComp (e.g., start color component) is set to 0, and the variable numComps (e.g., number of color components) is set to 1 when only luma component is coded, and is set to 3 when both luma component and chroma components are coded. Then, the size of the palette predictor list (e.g., denoted by PredictorPaletteSize), and entries of the palette predictor list (e.g., denoted by predictorPaletteEntries) can be updated according to the syntax (900).

In another example, for a palette coded luma block under global dual tree, the palette prediction list can be updated based on the block. For example, in the cases of CTU level dual tree (global dual tree), treeType is equal to DUAL_TREE_LUMA, slice_type is equal to I, the global dual tree flag qtbtt_dual_tree_intra_flag is equal to 1, thus the localDualtree is equal to 0. Further, the variable startComp is set to 0, and numComps is set to 1. Then, the size of the palette predictor list (e.g., denoted by PredictorPaletteSize), and entries of the palette predictor list (e.g., denoted by predictorPaletteEntries) can be updated according to the syntax (900).

In another example, for a palette coded chroma block under global dual tree, the palette prediction list can be updated based on the block. For example, in the cases of CTU level dual tree (global due tree), treeType is equal to DUAL_TREE_CHROMA, slice type is equal to I, the global dual tree flag qtbtt_dual_tree_intra_flag is equal to 1, thus the localDualtree is equal to 0. Further, the variable start-Comp is set to 1, and numComps is set to 2. Then, the size of the palette predictor list (e.g., denoted by PredictorPaletteSize), and entries of the palette predictor list (e.g., denoted by predictorPaletteEntries) can be updated according to the syntax (900).

In another example, for a palette coded chroma block under local dual tree, the update of the palette prediction list can be skipped. For example, treeType is equal to DUAL_TREE_CHROMA, slice_type is equal to I, the global dual tree flag qtbtt_dual_tree_intra_flag is equal to 0, thus the localDualtree is equal to 1. Then, the update process according to the syntax example (900) is skipped.

According to another aspect of the disclosure, when coding configurations that can trigger the use of local dual-tree are in use, the palette based coding mode is disallowed for small blocks. Thus, the complication of palette predictor list update in the case of local dual tree can be avoided.

In an example, when slice_type is not equal to I or, when slice_type is equal to I but a slice level flag to enable (global) dual tree (e.g. qtbtt_dual_tree_intra_flag) is equal to 0, the local dual tree can be triggered (e.g., localDualTree is equal to 1). When the local dual tree is triggered, small blocks, such as a coding unit with width×height<threshold, and the like are disallowed to be coded by palette based coding mode. In an embodiment, the threshold is defined such that no local dual-tree is used when the block size of current coding tree is above this threshold. In some examples, the palette based coding mode is disallowed to the small luma blocks and small chroma blocks under the local dual tree structure. In some examples, the palette based coding mode is only disallowed to the small chroma blocks under the local dual tree structure.

FIG. 10 shows a syntax example for determining, in the bitstream, an existence of a flag (pred_mode_plt_flag) that indicates whether the palette based coding mode is used for the current block. In the FIG. 10 example, the portion (1001) is used to apply the size constrain, and the portion (1002) is used to apply the chroma block and local dual tree constrain. For example, when the block is small (e.g., width×height is smaller than 16 for luma block, or width×height is smaller than 16×SubWidthC×SubHeightC for chroma block), the portion (1001) can be 0, thus the no pre_mode_plt_flag for the block exists in the bitstream, and the palette based coding mode is disallowed for the block.

In an example, for a chroma block under local dual tree structure, the modeType is equal to MODE_TYPE_INTRA, and the treeType is equal to DUAL_TREE_CHROMA, thus the portion (1002) can result 0. Thus, no pred_mode_plt_flag for the chroma block exists in the bitstream, and thus palette based coding mode is disallowed for the chroma block. In another example, for a chroma block of global dual tree, the modeType is equal to MODE_TYPE_ALL, and the treeType is equal to DUAL_TREE_CHROMA, thus the portion (1002) can result 1. Thus, the chroma block under global dual tree structure can be coded in palette based coding mode. In another example, for luma block under local dual tree structure, the modeType is equal to MODE_TYPE_INTRA, and the treeType is equal to DUAL_TREE_LUMA, thus the portion (1002) can result 1. Thus, the luma block under the local dual tree structure can be coded in the palette based coding mode.

According to another aspect of the disclosure, when local dual-tree is used, the maximum allowed predictor palette size and palette size are reduced, for example, by half. The reduction of the predictor palette size and the palette size can reduce the update complicity. In some examples, for each local region (smaller than CTU) that allows luma and chroma blocks to be coded separately (e.g., local dual tree), the maximum allowed predictor palette size and palette size are set to be the half of that for joint palette case (using palette having both luma and chroma components).

In an embodiment, the maximum allowed predictor palette size and palette size are respectively 63 and 31 for joint palette case. Then, under local dual-tree structure, the maximum allowed predictor palette size and palette size for the palette based coding mode of luma blocks are set to be 31 and 15 respectively; and the maximum allowed predictor palette size and palette size for the palette based coding mode of chroma blocks, are set to be 31 and 15 respectively.

Figure 11:
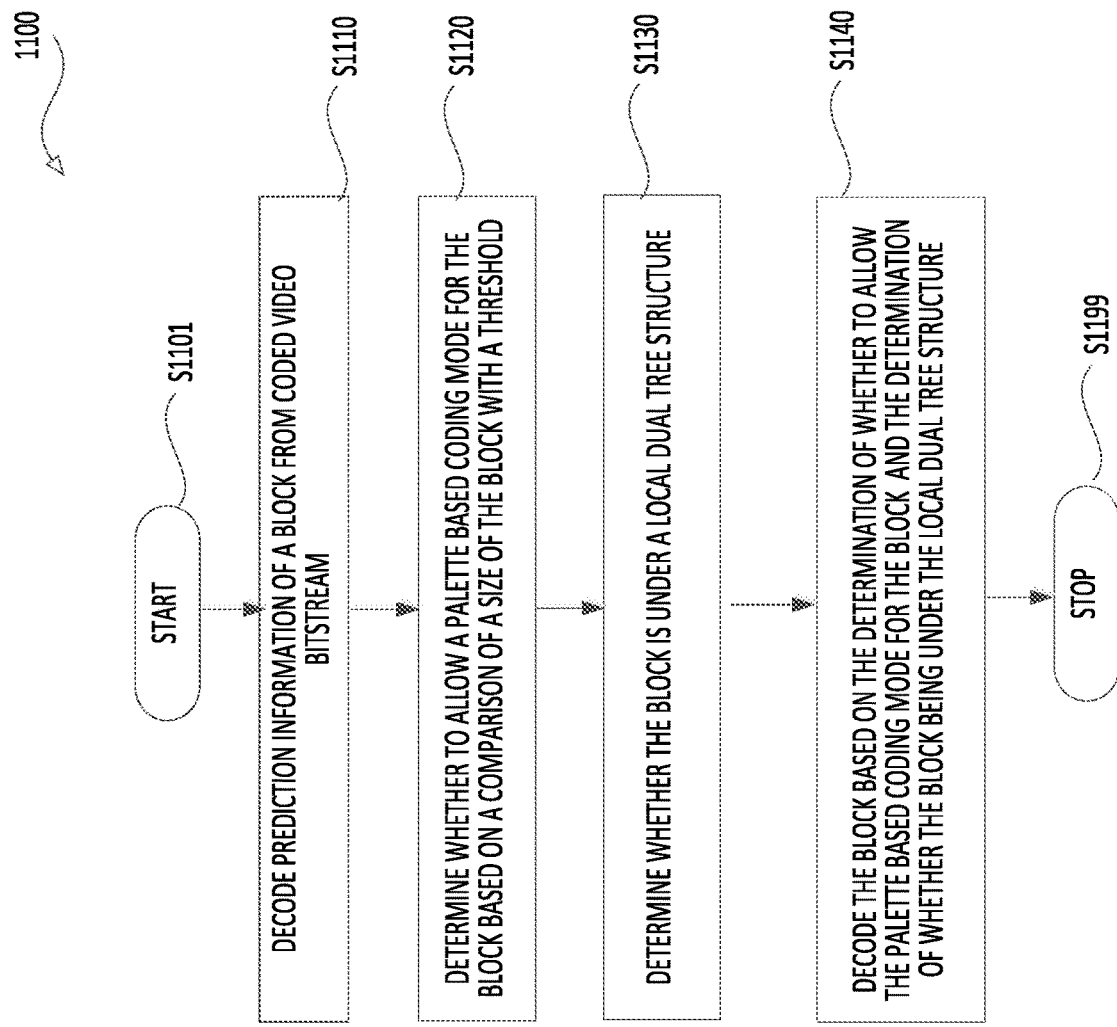
FIG. 11 shows a flow chart outlining a process example according to some embodiments of the disclosure.

FIG. 11 shows a flow chart outlining a process (1100) according to an embodiment of the disclosure. The process (1100) can be used in the reconstruction of a block. In various embodiments, the process (1100) are executed by processing circuitry, such as the processing circuitry in the terminal devices (310), (320), (330) and (340), the processing circuitry that performs functions of the video encoder (403), the processing circuitry that performs functions of the video decoder (410), the processing circuitry that performs functions of the video decoder (510), the processing circuitry that performs functions of the video encoder (603), and the like. In some embodiments, the process (1100) is implemented in software instructions, thus when the processing circuitry executes the software instructions, the processing circuitry performs the process (1100). The process starts at (S1101) and proceeds to (S1110).

At (S1110), prediction information of a block is decoded from the coded video bitstream.

At (S1120), whether to allow a palette based coding mode for the block is determined based on a comparison of a size of the block with a threshold.

At (S1130), whether the block is under a local dual tree structure is determined.

At (S1140), the block is decoded based on the determination of whether to allow the palette based coding mode for the block and the determination of whether the block is under the local dual tree structure.

In some embodiments, the palette based coding mode for the block is disallowed in response to the size of the block being smaller than the threshold. For example, when the condition (1001) is not satisfied for the block, the palette based coding mode is disallowed. In some examples, the threshold is defined, such that no local dual tree structure is used when the block is larger than the threshold.

In an embodiment, the palette based coding mode for the block is disallowed in response to the block being a chroma block and the size of the chroma block being smaller than the threshold. In an example, the palette based coding mode can be used in small luma blocks but not small chroma blocks.

In another embodiment, the palette based coding mode is disallowed for the block based on a combination of a mode type and a tree type of the block that indicates the block being a chroma block under the local dual tree structure. In an example, for decoding a block, when the mode type is equal to MODE_TYPE_INTRA and the tree type is equal to DUAL_TREE_CHROMA, such that the value of the condition (1002) is equal to 0, then the palette based coding mode for the block is disallowed.

In some embodiments, when the palette based coding mode is allowed, a flag (e.g., pred_mode_plt_flag) indicating whether the palette based coding mode is used on the block is decoded. In response to the flag indicating a use of the palette based coding mode on the block, the block is decoded using the palette based coding mode. In some embodiments, in response to the block being under the local dual tree structure, an update of a palette predictor list can be skipped or bypassed.

In some examples, the palette predictor list is updated based on a palette used in the decoding of the block updating, in response to no trigger of the local dual tree structure. In an example, the variable localDualTree is used to detect whether the local dual tree is triggered. For example, when the variable localDualTree is 0, the update of the palette predictor list based on the current palette of the block can be performed. In an example, when the variable localDualTree is 1, the update of the palette predictor list based on the current palette of the block is skipped. In another example, when the variable localDualTree is 1, the palette predictor list can be updated when the block is a luma block, and is skipped when the block is a chroma block.

In another embodiment, blocks under local dual tree structure, the maximum size of palette and the maximum size of the palette predictor list are reduced for example by half. In some examples, when the palette based coding mode is allowed for the block, a flag indicating whether the palette based coding mode is used on the block is decoded. Then, when the flag indicates a use of the palette based coding mode on the block and the block is under the local dual tree structure, the block is decoded based on a palette having a reduced maximum size for the palette. For example, the regular maximum size for palette is 31, and the reduced maximum size for palette is 15. Further, the palette predictor list is updated based on the palette used in the decoding of the block, and a size of the palette predictor list is limited by a reduced maximum size for the palette predictor list. For example, the regular maximum size for the palette predictor list is 63, and the reduced maximum size for the palette predictor list is 31.

Then, the process proceeds to (S1199) and terminates.

The techniques described above, can be implemented as computer software using computer-readable instructions and physically stored in one or more computer-readable media. For example, FIG. 12 shows a computer system (1200) suitable for implementing certain embodiments of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by one or more computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

Figure 12:
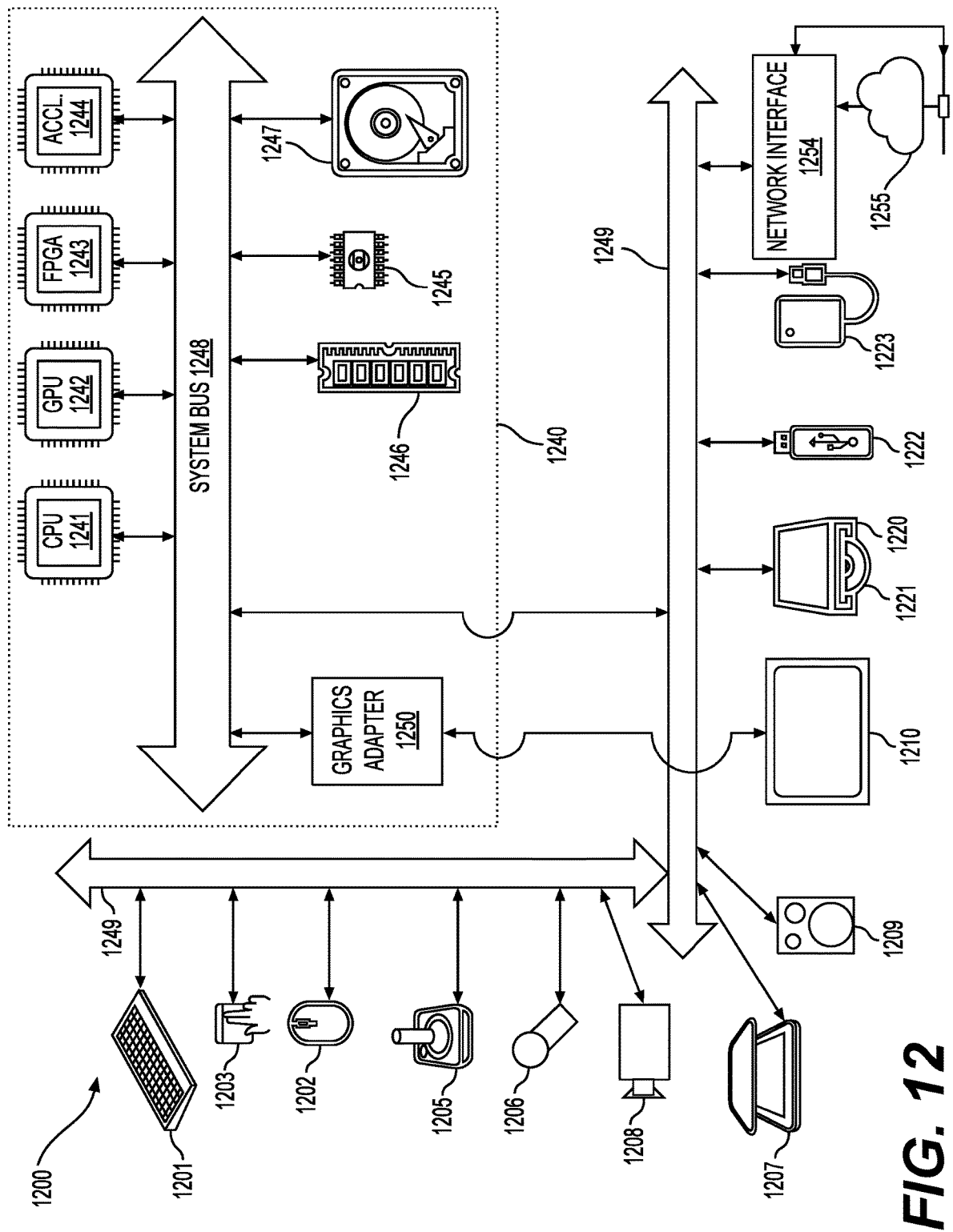
FIG. 12 is a schematic illustration of a computer system in accordance with an embodiment.

The components shown in FIG. 12 for computer system (1200) are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system (1200).

Computer system (1200) may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard (1201), mouse (1202), trackpad (1203), touch screen (1210), data-glove (not shown), joystick (1205), microphone (1206), scanner (1207), camera (1208).

Computer system (1200) may also include certain human interface output devices. Such human interface output devices may be stimulating the senses of one or more human users through, for example, tactile output, sound, light, and smell/taste. Such human interface output devices may include tactile output devices (for example tactile feedback by the touch-screen (1210), data-glove (not shown), or joystick (1205), but there can also be tactile feedback devices that do not serve as input devices), audio output devices (such as: speakers (1209), headphones (not depicted)), visual output devices (such as screens (1210) to include CRT screens, LCD screens, plasma screens, OLED screens, each with or without touch-screen input capability, each with or without tactile feedback capability—some of which may be capable to output two dimensional visual output or more than three dimensional output through means such as stereographic output; virtual-reality glasses (not depicted), holographic displays and smoke tanks (not depicted)), and printers (not depicted).

Computer system (1200) can also include human accessible storage devices and their associated media such as optical media including CD/DVD ROM/RW (1220) with CD/DVD or the like media (1221), thumb-drive (1222), removable hard drive or solid state drive (1223), legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system (1200) can also include an interface to one or more communication networks. Networks can for example be wireless, wireline, optical. Networks can further be local, wide-area, metropolitan, vehicular and industrial, real-time, delay-tolerant, and so on. Examples of networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks commonly require external network interface adapters that attached to certain general purpose data ports or peripheral buses (1249) (such as, for example USB ports of the computer system (1200)); others are commonly integrated into the core of the computer system (1200) by attachment to a system bus as described below (for example Ethernet interface into a PC computer system or cellular network interface into a smartphone computer system). Using any of these networks, computer system (1200) can communicate with other entities. Such communication can be uni-directional, receive only (for example, broadcast TV), uni-directional send-only (for example CANbus to certain CANbus devices), or bi-directional, for example to other computer systems using local or wide area digital networks. Certain protocols and protocol stacks can be used on each of those networks and network interfaces as described above.

Aforementioned human interface devices, human-accessible storage devices, and network interfaces can be attached to a core (1240) of the computer system (1200).

The core (1240) can include one or more Central Processing Units (CPU) (1241), Graphics Processing Units (GPU) (1242), specialized programmable processing units in the form of Field Programmable Gate Areas (FPGA) (1243), hardware accelerators for certain tasks (1244), and so forth. These devices, along with Read-only memory (ROM) (1245), Random-access memory (1246), internal mass storage such as internal non-user accessible hard drives, SSDs, and the like (1247), may be connected through a system bus (1248). In some computer systems, the system bus (1248) can be accessible in the form of one or more physical plugs to enable extensions by additional CPUs, GPU, and the like. The peripheral devices can be attached either directly to the core's system bus (1248), or through a peripheral bus (1249). Architectures for a peripheral bus include PCI, USB, and the like.

CPUs (1241), GPUs (1242), FPGAs (1243), and accelerators (1244) can execute certain instructions that, in combination, can make up the aforementioned computer code. That computer code can be stored in ROM (1245) or RAM (1246). Transitional data can be also be stored in RAM (1246), whereas permanent data can be stored for example, in the internal mass storage (1247). Fast storage and retrieve to any of the memory devices can be enabled through the use of cache memory, that can be closely associated with one or more CPU (1241), GPU (1242), mass storage (1247), ROM (1245), RAM (1246), and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system having architecture (1200), and specifically the core (1240) can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core (1240) that are of non-transitory nature, such as core-internal mass storage (1247) or ROM (1245). The software implementing various embodiments of the present disclosure can be stored in such devices and executed by core (1240). A computer-readable medium can include one or more memory devices or chips, according to particular needs. The software can cause the core (1240) and specifically the processors therein (including CPU, GPU, FPGA, and the like) to execute particular processes or particular parts of particular processes described herein, including defining data structures stored in RAM (1246) and modifying such data structures according to the processes defined by the software. In addition or as an alternative, the computer system can provide functionality as a result of logic hardwired or otherwise embodied in a circuit (for example: accelerator (1244)), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

Appendix A: Acronyms

JEM: joint exploration model
VVC: versatile video coding
BMS: benchmark set
MV: Motion Vector
HEVC: High Efficiency Video Coding
SEI: Supplementary Enhancement Information
VUI: Video Usability Information
GOPs: Groups of Pictures
TUs: Transform Units,
PUs: Prediction Units
CTUs: Coding Tree Units
CTBs: Coding Tree Blocks
PBs: Prediction Blocks
HRD: Hypothetical Reference Decoder
SNR: Signal Noise Ratio
CPUs: Central Processing Units
GPUs: Graphics Processing Units
CRT: Cathode Ray Tube
LCD: Liquid-Crystal Display
OLED: Organic Light-Emitting Diode
CD: Compact Disc
DVD: Digital Video Disc
ROM: Read-Only Memory
RAM: Random Access Memory
ASIC: Application-Specific Integrated Circuit
PLD: Programmable Logic Device
LAN: Local Area Network
GSM: Global System for Mobile communications
LTE: Long-Term Evolution
CANBus: Controller Area Network Bus
USB: Universal Serial Bus
PCI: Peripheral Component Interconnect
FPGA: Field Programmable Gate Areas
SSD: solid-state drive
IC: Integrated Circuit
CU: Coding Unit While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

What is claimed is:

1. A method of video encoding, comprising:
   determining, by a processor, whether a block is under a local dual tree structure;

determining, by the processor, whether to allow a palette based coding mode for encoding the block based on a comparison of a size of the block with a threshold;

encoding, by the processor, the block based on the determination of whether to allow the palette based coding mode for encoding the block and the determination of whether the block is under the local dual tree structure; and generating, by the processor, a coded video bitstream including the encoded block and prediction information indicating whether the block is under the local dual tree structure.

2. The method of claim 1, further comprising:
disallowing, by the processor, the palette based coding mode for encoding the block in response to the size of the block being smaller than the threshold.

3. The method of claim 1, wherein the threshold is defined to disallow the local dual tree structure in response to the block being larger than the threshold.

4. The method of claim 1, further comprising:
disallowing the palette based coding mode for the block in response to the block being a chroma block and the size of the chroma block being smaller than the threshold.

5. The method of claim 1, further comprising:
disallowing the palette based coding mode for the block based on a combination of a mode type and a tree type of the block that indicates the block being a chroma block under the local dual tree structure.

6. The method of claim 1, further comprising:
encoding, in the coded video bitstream, a flag indicating whether the block is encoded using the palette based coding mode in response to the palette based coding mode being allowed; and
bypassing an update of a palette predictor list in response to the block being under the local dual tree structure.

7. The method of claim 6, further comprising:
updating, in response to not triggering of the local dual tree structure, the palette predictor list based on a palette used in the encoding of the block.

8. The method of claim 1, further comprising:
encoding, in the coded video bitstream, a flag indicating whether the block is encoded using the palette based coding mode in response to the palette based coding mode being allowed; and
encoding the block based on a palette having a reduced maximum size in response to the block being under the local dual tree structure.

9. The method of claim 8, further comprising:
updating a palette predictor list based on the palette used in the encoding of the block, a size of the palette predictor list being limited by a reduced maximum size.

10. An apparatus for video encoding, comprising:
processing circuitry configured to:
determine whether a block is under a local dual tree structure;
determine whether to allow a palette based coding mode for encoding the block based on a comparison of a size of the block with a threshold;
encode the block based on the determination of whether to allow the palette based coding mode for encoding the block and the determination of whether the block is under the local dual tree structure; and
generate a coded video bitstream including the encoded block and prediction information indicating whether the block is under the local dual tree structure.

11. The apparatus of claim 10, wherein the processing circuitry is configured to:
disallow, the palette based coding mode for encoding the block in response to the size of the block being smaller than the threshold.

12. The apparatus of claim 10, wherein the threshold is defined to disallow the local dual tree structure in response to the block being larger than the threshold.

13. The apparatus of claim 10, wherein the processing circuitry is configured to:
disallow the palette based coding mode for the block in response to the block being a chroma block and the size of the chroma block being smaller than the threshold.

14. The apparatus of claim 10, wherein the processing circuitry is configured to:
disallow the palette based coding mode for the block based on a combination of a mode type and a tree type of the block that indicates the block being a chroma block under the local dual tree structure.

15. The apparatus of claim 10, wherein the processing circuitry is configured to:
encode, in the coded video bitstream, a flag indicating whether the block is encoded using the palette based coding mode in response to the palette based coding mode being allowed; and
bypass an update of a palette predictor list in response to the block being under the local dual tree structure.

16. The apparatus of claim 15, wherein the processing circuitry is configured to:
update, in response to not triggering the local dual tree structure, the palette predictor list based on a palette used in the encoding of the block.

17. The apparatus of claim 10, wherein the processing circuitry is configured to:
encode, in the coded video bitstream, a flag indicating whether the block is encoded using the palette based coding mode in response to the palette based coding mode being allowed; and
encode the block based on a palette having a reduced maximum size in response to the block being under the local dual tree structure.

18. The apparatus of claim 17, wherein the processing circuitry is configured to:
update a palette predictor list based on the palette used in the encoding of the block, a size of the palette predictor list being limited by a reduced maximum size.

19. A non-transitory computer-readable medium storing instructions which, when executed by a computer for video encoding, cause the computer to perform:
determining whether a block is under a local dual tree structure;
determining whether to allow a palette based coding mode for encoding the block based on a comparison of a size of the block with a threshold;
encoding the block based on the determination of whether to allow the palette based coding mode for encoding the block and the determination of whether the block is under the local dual tree structure; and
generating a coded video bitstream including the encoded block and prediction information indicating whether the block is under the local dual tree structure.

20. The non-transitory computer-readable medium of claim 19, wherein the instructions cause the computer to perform:
disallowing the palette based coding mode for encoding the block based on a combination of a mode type and a tree type of the block that indicates the block being a chroma block under the local dual tree structure.

\* \* \* \* \*